(12) United States Patent
Tanahashi et al.

(10) Patent No.: US 8,974,982 B2
(45) Date of Patent: Mar. 10, 2015

(54) FUEL CELL, FUEL CELL STACK, AND METHOD FOR MANUFACTURING FUEL CELL

(75) Inventors: Hideaki Tanahashi, Komaki (JP); Yutaka Ishioka, Nagoya (JP); Kazutaka Iizuka, Nisshin (JP); Chisato Kato, Aichi-gun (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 1270 days.

(21) Appl. No.: 12/259,669

(22) Filed: Oct. 28, 2008

(65) Prior Publication Data

US 2009/0214917 A1 Aug. 27, 2009

(30) Foreign Application Priority Data

Feb. 21, 2008 (JP) .................. 2008-039970

(51) Int. Cl.
- *H01M 8/10* (2006.01)
- *H01M 2/08* (2006.01)
- *H01M 8/02* (2006.01)

(52) U.S. Cl.
CPC .......... *H01M 8/1004* (2013.01); *H01M 8/0273* (2013.01); *H01M 8/0276* (2013.01); *H01M 8/0284* (2013.01); *H01M 8/0286* (2013.01); *H01M 2008/1095* (2013.01); *Y02E 60/521* (2013.01)
USPC ............ 429/469; 429/463; 429/508; 429/480

(58) Field of Classification Search
USPC ......... 429/507–511, 460, 470, 467, 463, 471, 429/469, 480
See application file for complete search history.

(56) References Cited

U.S. PATENT DOCUMENTS 5,187,025 A * 2/1993 Kelland et al. ................ 429/492
6,080,503 A * 6/2000 Schmid et al. ................ 429/483

(Continued)

FOREIGN PATENT DOCUMENTS

EP 1 622 217 A2 2/2006
JP A-09-199145 7/1997

(Continued)

OTHER PUBLICATIONS

European Office Action issued in European Patent Application No. 08 018 998.8; mailed Apr. 14, 2011.

(Continued)

*Primary Examiner* — David C Mellon
(74) *Attorney, Agent, or Firm* — Oliff PLC

(57) ABSTRACT

A fuel cell includes a membrane electrode assembly (MEA) having an electrolyte membrane and a pair of electrodes arranged on both sides of the electrolyte membrane in the thickness direction, a pair of frames having a frame shape and holding an outer periphery portion of the electrolyte membrane, a pair of gas diffusion layers arranged inside the pair of frames and on both sides of the MEA in the thickness direction, and a gasket covering at least a part of the pair of frames. The fuel cell further includes a first cross-linking adhesive member formed of rubber which includes a membrane accommodating portion having an indented shape for accommodating the outer periphery portion of the electrolyte membrane and a first intermediate portion interposed between the pair of frames and which is subjected to cross-linking adhesion with the outer periphery portion of the electrolyte membrane and the pair of frames.

11 Claims, 16 Drawing Sheets

(56) References Cited

U.S. PATENT DOCUMENTS

| | | | |
|---|---|---|---|
| 6,117,287 A * | 9/2000 | Molter et al. | 204/255 |
| 6,440,597 B1 * | 8/2002 | Mizuno | 429/465 |
| 6,720,103 B1 * | 4/2004 | Nagai | 429/463 |
| 6,861,171 B1 * | 3/2005 | Suzuki | 429/510 |
| 6,989,214 B2 * | 1/2006 | Mao et al. | 429/460 |
| 7,074,357 B2 * | 7/2006 | Senda et al. | 264/259 |
| 7,276,310 B2 * | 10/2007 | Kobayashi et al. | 429/483 |
| 7,534,518 B2 * | 5/2009 | Ishioka et al. | 429/483 |
| 7,851,100 B2 * | 12/2010 | Kobayashi et al. | 429/463 |
| 2003/0082430 A1 * | 5/2003 | Suzuki | 429/36 |
| 2005/0181267 A1 * | 8/2005 | Mitsuta et al. | 429/40 |
| 2006/0134498 A1 * | 6/2006 | Hamm et al. | 429/37 |
| 2006/0269819 A1 * | 11/2006 | Artibise et al. | 429/35 |
| 2007/0082251 A1 * | 4/2007 | Inagaki | 429/36 |
| 2007/0134538 A1 | 6/2007 | Yuichi et al. | |
| 2007/0148525 A1 | 6/2007 | Kuroki et al. | |
| 2007/0287056 A1 * | 12/2007 | Tanahashi et al. | 429/36 |
| 2010/0119918 A1 * | 5/2010 | Hayashi | 429/35 |

FOREIGN PATENT DOCUMENTS

| | | |
|---|---|---|
| JP | A-2002-260693 | 9/2002 |
| JP | A 2007-42347 | 2/2007 |
| JP | A-2007-157420 | 6/2007 |
| WO | WO 2006/075867 A1 | 7/2006 |
| WO | WO 2008105348 A1 * | 9/2008 |

OTHER PUBLICATIONS

Search Report issued in European Patent Application No. 08018998.8, on Jul. 26, 2010.

Mar. 5, 2013 Office Action issued in Japanese Patent Application No. JP 2008-039970 (with translation).

* cited by examiner

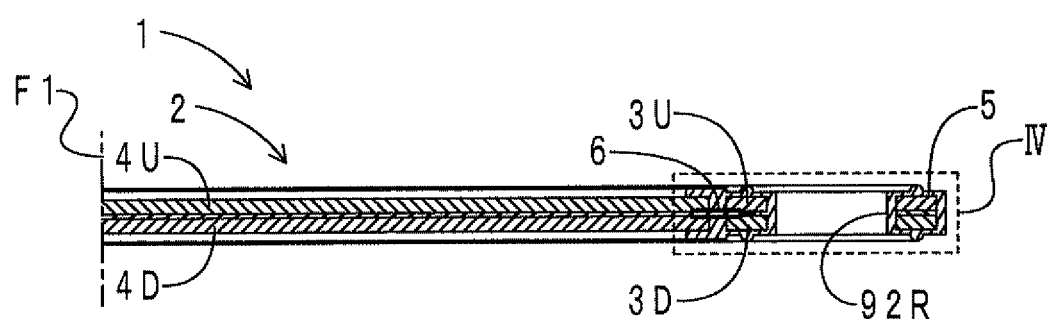
F I G. 3 B

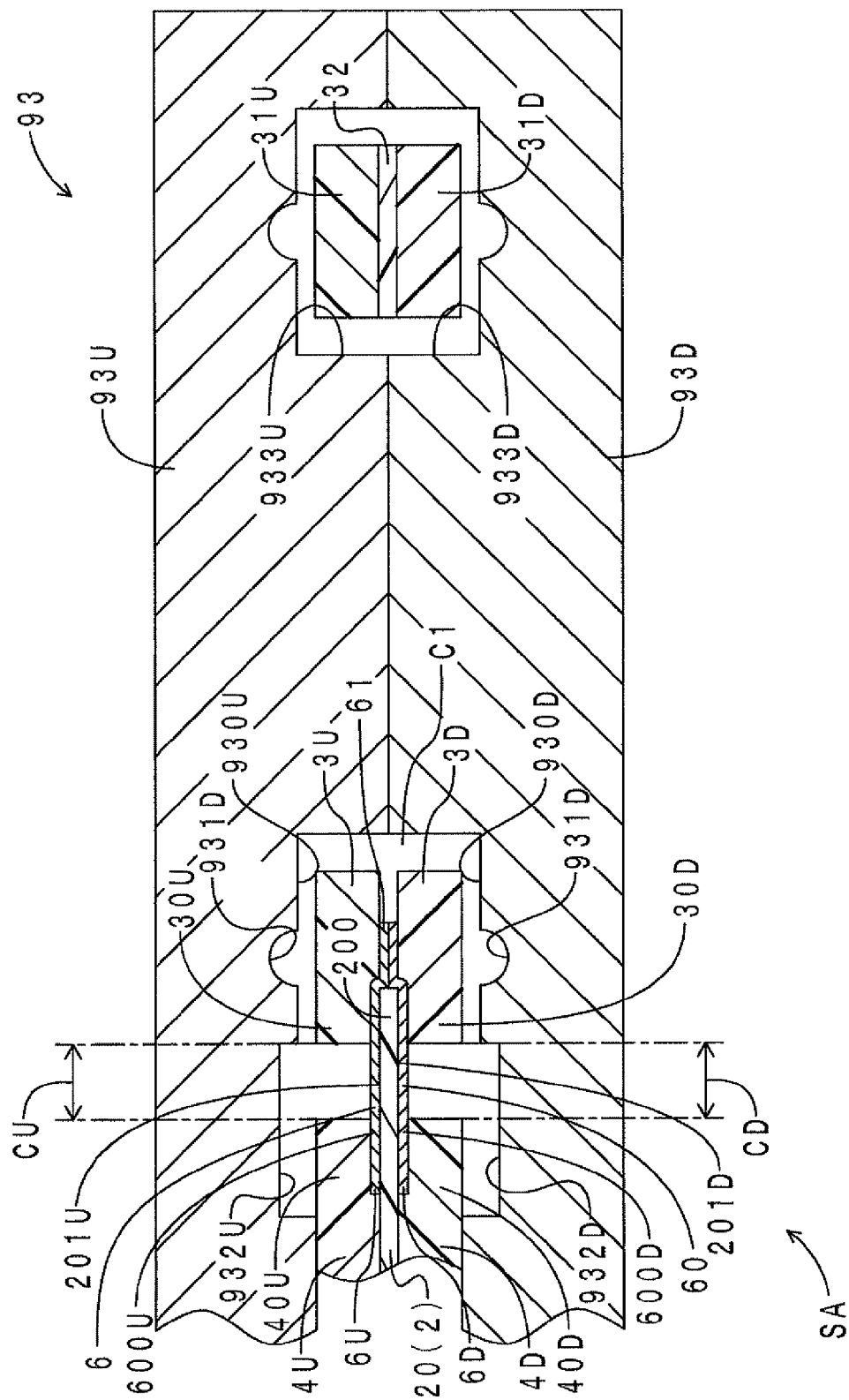
F I G. 6

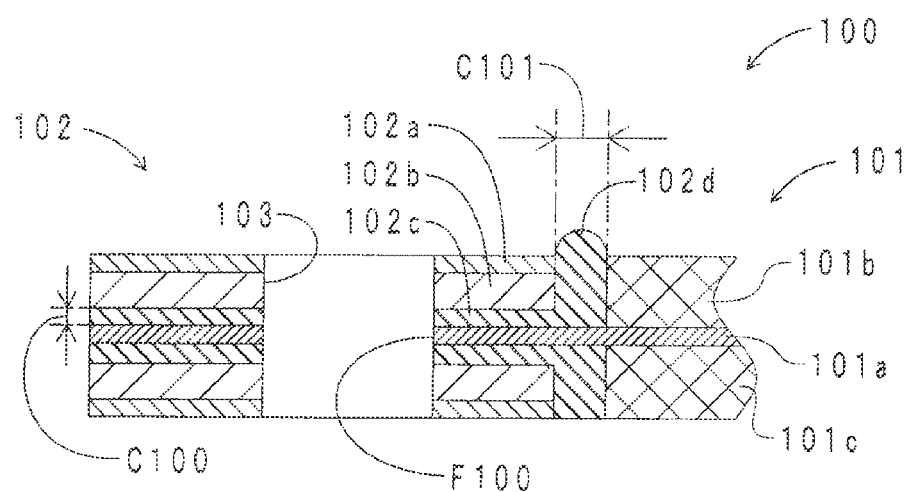
F I G. 12

Prior Art

FUEL CELL, FUEL CELL STACK, AND METHOD FOR MANUFACTURING FUEL CELL

INCORPORATION BY REFERENCE

The disclosure of Japanese Patent Application No. 2008-39970 filed on Feb. 21, 2008 including the specification, drawings and abstract is incorporated herein by reference in its entirety.

BACKGROUND OF THE INVENTION

1. Field of the Invention

The present invention relates to a fuel cell, a fuel cell stack, and a method for manufacturing a fuel cell.

2. Description of the Related Art

A fuel cell stack has a structure formed by stacking a number of fuel cells. A stack of the number of fuel cells is fastened by end plates arranged on both sides in the stacking direction.

The fuel cell includes a membrane electrode assembly (hereinafter abbreviated as "MEA"). The MEA includes an electrolyte membrane and a pair of electrodes. The pair of electrodes are arranged on both sides of the electrolyte membrane in the thickness direction. One of the pair of electrodes is a fuel electrode, and the other is an oxygen electrode. The fuel electrode is supplied with fuel gas such as hydrogen and hydrocarbon. The oxygen electrode is supplied with oxidant gas such as oxygen and air. The supplied gas, the electrolyte membrane, and the electrodes are subjected to an electrochemical reaction at three phase boundary to generate electricity.

For example, Japanese Patent Application Publication No. JP-A-2002-260693 discloses a fuel cell having a seal structure for suppressing mixture (crossover) of the fuel gas and the oxidant gas. FIG. 12 shows a partial sectional view of the fuel cell disclosed in the document. An outer periphery portion of the fuel cell is shown in FIG. 12. As shown in FIG. 12, a fuel cell 100 includes an MEA 101 and a gasket 102. The MEA 101 includes an electrolyte membrane 101a and a pair of electrodes 101b and 101c. The pair of electrodes 101b and 101c are arranged on both surfaces in the thickness direction of the electrolyte membrane 101a. The gasket 102 has a three-layer structure formed by stacking an elastic layer 102a, a shape preservation layer 102b, and a thermal cross-linking layer 102c.

The thermal cross-linking layer 102c bends and extends in an L-shape. Specifically, the thermal cross-linking layer 102c extends from a thickness direction gap C100 between the electrolyte membrane 101a and the shape preservation layer 102b to a surface extending direction gap C101 between the elastic layer 102a as well as the shape preservation layer 102b and the electrode 101b. In a thickness direction end portion of the thermal cross-linking layer 102c, a rib 102d is formed.

A method for manufacturing the fuel cell 100 includes a gasket original sheet preparation step, a gasket original sheet punching step, an in-cavity arrangement step, and a cross-linking step. FIG. 13 shows a schematic view of the gasket original sheet preparation step. FIG. 14 shows a schematic view of the gasket original sheet punching step. FIG. 15 shows a schematic view of the in-cavity arrangement step.

In the gasket original sheet preparation step, as shown in FIG. 13, an original sheet of the gasket 102 having the three-layer structure is prepared. The original sheet of the gasket 102 is formed by stacking the elastic layer 102a, the shape preservation layer 102b, and the uncross-linked thermal cross-linking layer 102c. In the gasket original sheet punching step, as shown in FIG. 14, a hole such as a manifold hole 103 is punched out in a predetermined portion of the original sheet of the gasket 102.

In the in-cavity arrangement step, as shown in FIG. 15, the MEA 101 and the original sheet of the gasket 102 are stacked and arranged in a cavity of a metal mold 104. The thermal cross-linking layer 102c is arranged only in the thickness direction gap C100. Next, a mold clamping of the metal mold 104 is performed. The thermal cross-linking layer 102c is compressed in the thickness direction by the mold clamping. Therefore, the thermal cross-linking layer 102c flows to spill out in the surface extending direction, and is filled in the surface extending direction gap C101 as shown with white arrows in FIG. 15. In the cross-linking step, the thermal cross-linking layer 102c is cross-linked. Thus, the fuel cell 100 is manufactured.

With the fuel cell 100 disclosed in the document, the thermal cross-linking layer 102c and the electrolyte membrane 101a are subjected to cross-linking adhesion. Therefore, the thermal cross-linking layer 102c and the electrolyte membrane 101a are firmly joined. Thus, a crossover due to separation of the electrolyte membrane 101a and the gasket 102 can be suppressed.

However, in the fuel cell 100 disclosed in the document, an end surface F100 of the electrolyte membrane 101a is exposed to the manifold hole 103, as shown in FIG. 12. Therefore, there has been a possibility of a product due to decomposition of the electrolyte membrane 101a, such as a fluoride and a sulfonic acid, leaking from the end surface F100.

In this regard, Japanese Patent Application Publication No. JP-A-9-199145 discloses a fuel cell in which an outer periphery portion of an electrolyte membrane is sealed with an epoxy adhesive. In the fuel cell disclosed in the document, an end surface of the electrolyte membrane is covered by the adhesive. Therefore, the possibility of a product leaking from the end surface of the electrolyte membrane is small.

However, with the fuel cell of the Japanese Patent Application Publication No. JP-A-9-199145, it is necessary to form an ion exchange section in the outer periphery portion of the electrolyte membrane in order to improve the adhesiveness of the electrolyte membrane and the adhesive. In order to form the ion exchange section, it is necessary to mount a predetermined masking tool to the electrolyte membrane, and then immerse the electrolyte membrane in a potassium hydroxide solution. This operation is complicated. Also, the necessity for this operation leads to an increase in manufacturing cost of the fuel cell and consequently the fuel cell stack.

Japanese Patent Application Publication No. JP-A-2007-157420 discloses a fuel cell in which an outer periphery portion of an electrolyte membrane is sealed with an annular ribbon having a thermoplastic resin layer. In the fuel cell disclosed in the document, an end surface of the electrolyte membrane is covered by the annular ribbon. Therefore, the possibility of a product leaking from the end surface of the electrolyte membrane is small.

However, in the fuel cell of the Japanese Patent Application Publication No. JP-A-2007-157420, the annular ribbon is sandwiched merely by a pair of gaskets from both sides in the thickness direction. Therefore, the annular ribbon tends to fall from between the pair of gaskets. Also, there is a possibility of the thermoplastic resin layer of the annular ribbon deforming due to heat. Therefore, the thermoplastic resin layer may separate from the end surface of the electrolyte membrane due to heat. Thus, the sealability at the end surface of the electrolyte membrane may deteriorate.

SUMMARY OF THE INVENTION

A fuel cell, a fuel cell stack, and a method for manufacturing a fuel cell according to some aspects of the present invention have been completed in view of the problems described above. Thus, it is an object of the present invention to provide a fuel cell and a fuel cell stack having high sealability and adhesiveness in an outer periphery portion of an electrolyte membrane. It is also an object of the present invention to provide a method for manufacturing a fuel cell by which a fuel cell having high sealability and adhesiveness in an outer periphery portion of an electrolyte membrane can be easily manufactured.

(1) In order to solve the problems described above, according to a first aspect of the present invention, a fuel cell includes: an MEA having an electrolyte membrane and a pair of electrodes arranged on both sides of the electrolyte membrane in a thickness direction; a pair of frames having a frame shape and holding an outer periphery portion of the electrolyte membrane; a pair of gas diffusion layers arranged inside the pair of frames and on both sides of the MEA in the thickness direction; and a gasket covering at least a part of the pair of frames. The fuel cell further includes a first cross-linking adhesive member formed of rubber, which includes a membrane accommodating portion having an indented shape for accommodating the outer periphery portion of the electrolyte membrane and a first intermediate portion interposed between the pair of frames, and which is subjected to cross-linking adhesion with the outer periphery portion of the electrolyte membrane and the pair of frames.

The outer periphery portion of the electrolyte membrane is accommodated in the membrane accommodating portion of the first cross-linking adhesive member. Therefore, an external leak of a product due to decomposition of the electrolyte membrane, such as a fluoride and a sulfonic acid, via an end surface of the outer periphery portion of the electrolyte membrane can be suppressed. The outer periphery portion of the electrolyte membrane is subjected to cross-linking adhesion with the first cross-linking adhesive member. Therefore, the outer periphery portion of the electrolyte membrane hardly falls from the membrane accommodating portion of the first cross-linking adhesive member. In this manner, the fuel cell of the present aspect has high sealability and adhesiveness between the outer periphery portion of the electrolyte membrane and the first cross-linking adhesive member.

The first intermediate portion of the first cross-linking adhesive member is arranged between the pair of frames. In addition, the pair of frames are subjected to cross-linking adhesion with the first cross-linking adhesive member. Therefore, the fuel cell of the present aspect has high sealability and adhesiveness between the pair of frames and the first cross-linking adhesive member.

The first cross-linking adhesive member is formed of rubber. It is therefore less likely that the first cross-linking adhesive member separates from the outer periphery portion of the electrolyte membrane due to heat, unlike in the thermoplastic resin of the annular ribbon of the fuel cell of Japanese Patent Application Publication No. JP-A-2007-157420 mentioned above.

The first cross-linking adhesive member is formed of rubber, and therefore is highly water-repellent. Thus, moisture hardly reaches an adhesion boundary surface between the outer periphery portion of the electrolyte membrane and the first cross-linking adhesive member and an adhesion boundary surface between the pair of frames and the first cross-linking adhesive member. That is, the sealability and the adhesiveness are hardly degraded between the outer periphery portion of the electrolyte membrane and the first cross-linking adhesive member and between the pair of frames and the first cross-linking adhesive member.

The first cross-linking adhesive member is formed of rubber, and therefore has a wide elastic deformation region. Thus, the first cross-linking adhesive member can easily follow swelling and shrinkage deformation of the electrolyte membrane. Also, the difference in deformation amount between the electrolyte membrane and the pair of frames can be easily offset by the first cross-linking adhesive member. The sealability and the adhesiveness between the outer periphery portion of the electrolyte membrane and the first cross-linking adhesive member are hardly degraded in this regard as well. With the fuel cell of the present aspect, the electrolyte membrane, i.e., the MEA, and the pair of frames can be firmly connected via the first cross-linking adhesive member.

(2) Preferably, according to a second aspect of the present invention, the fuel cell based on the configuration of (1) described above has a configuration in which the membrane accommodating portion includes a second intermediate portion interposed between the outer periphery portion of the electrolyte membrane and an outer periphery portion of the gas diffusion layers.

With this configuration, the membrane accommodating portion of the first cross-linking adhesive member and the outer periphery portion of the gas diffusion layers are subjected to cross-linking adhesion. Therefore, with this configuration, the sealability and the adhesiveness between the membrane accommodating portion of the first cross-linking adhesive member and the outer periphery portion of the gas diffusion layers are high.

The first cross-linking adhesive member is formed of rubber. It is therefore less likely that the membrane accommodating portion of the first cross-linking adhesive member separates from the outer periphery portion of the gas diffusion layers due to heat.

The first cross-linking adhesive member is formed of rubber, and therefore is highly water-repellent. Thus, moisture hardly reaches an adhesion boundary surface between the membrane accommodating portion of the first cross-linking adhesive member and the outer periphery portion of the gas diffusion layers. That is, the sealability and the adhesiveness between the membrane accommodating portion of the first cross-linking adhesive member and the outer periphery portion of the gas diffusion layers are hardly degraded.

The first cross-linking adhesive member is formed of rubber, and therefore has a wide elastic deformation region. Thus, the first cross-linking adhesive member can easily offset the difference in deformation amount between the electrolyte membrane and the gas diffusion layers. The sealability and the adhesiveness between the membrane accommodating portion of the first cross-linking adhesive member and the outer periphery portion of the gas diffusion layers is hardly degraded in this regard as well. With this configuration, the electrolyte membrane, i.e., the MEA, and the gas diffusion layers can be firmly connected via the first cross-linking adhesive member.

(3) Preferably, according to a third aspect of the present invention, the fuel cell based on the configuration of (1) or (2) described above has a configuration in which the gasket integrally includes a holding frame portion that holds the outer periphery portion of the gas diffusion layers from outside in the thickness direction. With this configuration, the outer periphery portion of the gas diffusion layers is held in a gap between the holding frame portion of the gasket and the outer periphery portion of the electrolyte membrane in the thickness direction. Therefore, the gas diffusion layers and the MEA are hardly separated.

(4) Preferably, according to a fourth aspect of the present invention, the fuel cell based on the configuration of any one of (1) to (3) described above also includes a second cross-linking adhesive member formed of rubber and provided between the gasket and the frames.

With this configuration, the gasket and the second cross-linking adhesive member are subjected to cross-linking adhesion. In addition, the frames and the second cross-linking adhesive member are subjected to cross-linking adhesion. Therefore, the sealability and the adhesiveness between the gasket and the second cross-linking adhesive member and between the frames and the second cross-linking adhesive member are high. The second cross-linking adhesive member is formed of rubber, and therefore is highly water-repellent. Thus, moisture hardly reaches an adhesion boundary surface between the gasket and the second cross-linking adhesive member and an adhesion boundary surface between the frames and the second cross-linking adhesive member. That is, the sealability and the adhesiveness between the gasket and the second cross-linking adhesive member and between the frames and the second cross-linking adhesive member are hardly degraded.

The second cross-linking adhesive member is formed of rubber, and therefore has a wide elastic deformation region. Thus, the difference in deformation amount between the gasket and the frames can be easily offset. The sealability and the adhesiveness between the gasket and the second cross-linking adhesive member and between the frames and the second cross-linking adhesive member are hardly degraded in this regard as well. With this configuration, the gasket and the frames can be firmly connected via the second cross-linking adhesive member.

(5) Preferably, according to a fifth aspect of the present invention, the fuel cell based on the configuration of any one of (1) to (4) described above has a configuration in which the gasket integrally includes a rib that is arranged outside the frames in the thickness direction and is capable of making elastic contact with an opponent member adjacent in the thickness direction.

With this configuration, by making the rib elastic contact with the opponent member (for example, a separator) the sealability between the fuel cell and the opponent member can be ensured. As shown in FIG. 12, the electrolyte membrane 101a is arranged inside the rib 102d of the fuel cell 100 of Japanese Patent Application Publication No. JP-A-2002-260693 in the thickness direction. Therefore, the reaction force due to the rib 102d making the elastic contact with the opponent member is easily applied to the electrolyte membrane 101a. The rib 102d is formed of rubber, and therefore tends to elastically deform. Therefore, the elastic force on the opponent member tends to be small.

In contrast, the rib of the fuel cell of this configuration is arranged outside the frames in the thickness direction. That is, the rib is supported by the frames from the inside in the thickness direction. Therefore, with this configuration, the elastic force on the opponent member is hardly made small. Even in the case where the electrolyte membrane is hypothetically arranged inside the rib in the thickness direction (while it is needless to say that there are also cases where the electrolyte membrane is not arranged inside the rib in the thickness direction), the frames are interposed between the rib and the electrolyte membrane. Therefore, the reaction force due to the rib making the elastic contact with the opponent member is hardly applied to the electrolyte membrane.

As shown in FIG. 12, the rib 102d is subjected to compression deformation in the thickness direction when the rib 102d of the fuel cell 100 of the Japanese Patent Application Publication No. JP-A-2002-260693 makes elastic contact with the opponent member. In addition, the rib 102d is subjected to stretching deformation in the surface extending direction so as to expand the surface extending direction gap C101. The electrode 101b is adhered inside the rib 102d in the surface extending direction. On the other hand, the elastic layer 102a and the shape preservation layer 102b are adhered outside the rib 102d in the surface extending direction. Therefore, when the rib 102d is deformed, there is a possibility of the rib 102d and the electrode 101b, or the rib 102d and the elastic layer 102a as well as the shape preservation layer 102b being separated.

In contrast, the rib of the fuel cell of this configuration is arranged integrally with the gasket. That is, the rib and gasket are an integrated product. It is therefore less likely that the rib falls from the gasket even if the rib is deformed.

(6) Preferably, according to a sixth aspect of the present invention, the fuel cell based on the configuration of (5) described above has a configuration in which the gasket includes the rib and a base portion which is formed integrally at a base of the rib to hold the rib.

As described above, the first cross-linking adhesive member is formed of rubber, and therefore is highly water-repellent. Thus, moisture hardly reaches the adhesion boundary surface between the outer periphery portion of the electrolyte membrane and the first cross-linking adhesive member and the adhesion boundary surface between the pair of frames and the first cross-linking adhesive member. Therefore, even if entry of moisture is not intentionally suppressed with the gasket, it is less likely that the electrolyte membrane degrades due to moisture. With this configuration, the usage amount of a gasket raw material can be reduced. Therefore, the manufacturing cost of the fuel cell can be reduced.

(7) Preferably, according to a seventh aspect of the present invention, the fuel cell based on the configuration of any one of (1) to (6) described above has a configuration in which a gap is formed between a frame inner periphery portion of the frames and the outer periphery portion of the gas diffusion layers, the electrolyte membrane includes an exposed portion which is exposed externally from the gap, and the first cross-linking adhesive member covers the exposed portion.

With this configuration, the exposed portion is covered by the first cross-linking adhesive member. Therefore, an external leak of a product due to decomposition of the electrolyte membrane, such as a fluoride and a sulfonic acid, via the exposed portion can be suppressed.

(8) Preferably, according to an eighth aspect of the present invention, the fuel cell based on the configuration of any one of (1) to (6) described above has a configuration in which no gap is formed between a frame inner periphery portion of the frames and the outer periphery portion of the gas diffusion layers.

With this configuration, an external leak of a product due to decomposition of the electrolyte membrane, such as a fluoride and a sulfonic acid, from between the frame inner periphery portion of the frames and the outer periphery portion of the gas diffusion layers can be suppressed.

(9) Preferably, according to a ninth aspect of the present invention, the fuel cell based on the configuration of (8) described above has a configuration in which the outer periphery portion of the electrolyte membrane, the frame inner periphery portion of the frames, and the outer periphery portion of the gas diffusion layers are stacked outwardly from inside in the thickness direction, the membrane accommodating portion includes a third intermediate portion interposed between the outer periphery portion of the electrolyte membrane and the frame inner periphery portion of the frames, and the second cross-linking adhesive member is interposed between the frame inner periphery portion of the frames and the outer periphery portion of the gas diffusion layers.

With this configuration, the outer periphery portion of the electrolyte membrane, the frame inner periphery portion of the frames, and the outer periphery portion of the gas diffusion layers are stacked in the thickness direction. The third intermediate portion of the membrane accommodating portion of the first cross-linking adhesive member is interposed between the outer periphery portion of the electrolyte membrane and the frame inner periphery portion of the frames. The third intermediate portion is subjected to cross-linking adhesion with the outer periphery portion of the electrolyte membrane and the frame inner periphery portion of the frames. Therefore, the sealability and the adhesiveness between the third intermediate portion and the outer periphery portion of the electrolyte membrane are high. In addition, the sealability and the adhesiveness between the third intermediate portion and the frame inner periphery portion of the frames are high.

The second cross-linking adhesive member is interposed between the frame inner periphery portion of the frames and the outer periphery portion of the gas diffusion layers. The second cross-linking adhesive member is subjected to cross-linking adhesion with the frame inner periphery portion of the frames and the outer periphery portion of the gas diffusion layers. Therefore, the sealability and the adhesiveness between the second cross-linking adhesive member and the frame inner periphery portion of the frames are high. In addition, the sealability and the adhesiveness between the second cross-linking adhesive member and the outer periphery portion of the gas diffusion layers are high.

The third intermediate portion is formed of rubber. It is therefore less likely that the third intermediate portion separates from the outer periphery portion of the electrolyte membrane and the frame inner periphery portion of the frames due to heat.

The third intermediate portion is formed of rubber, and therefore is highly water-repellent. Thus, moisture hardly reaches an adhesion boundary surface between the outer periphery portion of the electrolyte membrane and the third intermediate portion and an adhesion boundary surface between the frame inner periphery portion of the frames and the third intermediate portion. That is, the sealability and the adhesiveness are hardly degraded between the outer periphery portion of the electrolyte membrane and the third intermediate portion and between the frame inner periphery portion of the frames and the third intermediate portion.

The third intermediate portion is formed of rubber, and therefore has a wide elastic deformation region. Thus, the difference in deformation amount between the electrolyte membrane and the frames can be easily offset. The sealability and the adhesiveness are hardly degraded between the outer periphery portion of the electrolyte membrane and the third intermediate portion and between the frame inner periphery portion of the frames and the third intermediate portion in this regard as well. The electrolyte membrane and the frames can be firmly connected via the third intermediate portion.

The second cross-linking adhesive member is formed of rubber. It is therefore less likely that the second cross-linking adhesive member separates from the frame inner periphery portion of the frames and the outer periphery portion of the gas diffusion layers due to heat.

The second cross-linking adhesive member is formed of rubber, and therefore is highly water-repellent. Thus, moisture hardly reaches an adhesion boundary surface between the frame inner periphery portion of the frames and the second cross-linking adhesive member and an adhesion boundary surface between the outer periphery portion of the gas diffusion layers and the second cross-linking adhesive member. That is, the sealability and the adhesiveness are hardly degraded between the inner periphery portion of the frames and the second cross-linking adhesive member and between the outer periphery portion of the gas diffusion layers and the second cross-linking adhesive member.

The second cross-linking adhesive member is formed of rubber, and therefore has a wide elastic deformation region. Thus, the difference in deformation amount between the frames and the gas diffusion layers can be easily offset. The sealability and the adhesiveness are hardly degraded between the frame inner periphery portion of the frames and the second cross-linking adhesive member and between the outer periphery portion of the gas diffusion layers and the second cross-inking adhesive member in this regard as well. The frames and the gas diffusion layers can be firmly connected via the second cross-linking adhesive member.

(10) In order to solve the problems described above, according to a tenth aspect of the present invention, a fuel cell stack includes a plurality of the fuel cells having the configuration of any one of (1) to (9) described above stacked on one another.

The fuel cell stack according to the present aspect has an advantageous effect of at least the configuration of (1) among the advantageous effects of the configurations of (1) to (9) described above. That is, the outer periphery portion of the electrolyte membrane is accommodated in the membrane accommodating portion of the first cross-linking adhesive member. Therefore, an external leak of a product due to decomposition of the electrolyte membrane, such as a fluoride and a sulfonic acid, via an end surface of the outer periphery portion of the electrolyte membrane can be suppressed. The outer periphery portion of the electrolyte membrane is subjected to cross-linking adhesion with the first cross-linking adhesive member. Therefore, the outer periphery portion of the electrolyte membrane hardly falls from the membrane accommodating portion of the first cross-linking adhesive member. In this manner, the fuel cell stack of the present aspect has high sealability and adhesiveness between the outer periphery portion of the electrolyte membrane and the first cross-linking adhesive member.

The first intermediate portion of the first cross-linking adhesive member is arranged between the pair of frames. In addition, the pair of frames are subjected to cross-linking adhesion with the first cross-linking adhesive member. Therefore, the fuel cell stack of the present aspect has high sealability and adhesiveness between the pair of frames and the first cross-linking adhesive member.

The first cross-linking adhesive member is formed of rubber. It is therefore less likely that the first cross-linking adhesive member separates from the outer periphery portion of the electrolyte membrane due to heat, unlike in the thermoplastic resin of the annular ribbon of the fuel cell of the Japanese Patent Application Publication No. JP-A-2007-157420 mentioned above.

The first cross-linking adhesive member is formed of rubber, and therefore is highly water-repellent. Thus, moisture hardly reaches the adhesion boundary surface between the outer periphery portion of the electrolyte membrane and the first cross-linking adhesive member and the adhesion boundary surface between the pair of frames and the first cross-linking adhesive member. That is, the sealability and the adhesiveness are hardly degraded between the outer periphery portion of the electrolyte membrane and the first cross-linking adhesive member and between the pair of frames and the first cross-linking adhesive member.

The first cross-linking adhesive member is formed of rubber, and therefore has a wide elastic deformation region. Thus, the first cross-linking adhesive member can easily follow the swelling and the shrinkage deformation of the electrolyte membrane. Also, the difference in deformation amount between the electrolyte membrane and the pair of frames can be easily offset. The sealability and adhesiveness between the outer periphery portion of the electrolyte membrane and the first cross-linking adhesive member are hardly degraded in this regard as well. With the fuel cell stack of the present aspect, the electrolyte membrane, i.e., the MEA, and the pair of frames can be firmly connected via the first cross-linking adhesive member.

(11) In order to solve the problems described above, according to an eleventh aspect of the present invention, a method for manufacturing a fuel cell includes the steps of: arranging a sub-assembly in a cavity of a mold, the sub-assembly including an MEA having an electrolyte membrane and a pair of electrodes arranged on both sides of the electrolyte membrane in a thickness direction, a pair of frames having a frame shape and holding an outer periphery portion of the electrolyte membrane, a pair of gas diffusion layers arranged inside the pair of frames and on both sides of the MEA in the thickness direction, and a first cross-linking adhesive member formed of uncross-linked rubber, which includes a membrane accommodating portion having an indented shape for accommodating an outer periphery portion of the electrolyte membrane and a first intermediate portion interposed between the pair of frames; and integrating the first cross-linking adhesive member, the outer periphery portion of the electrolyte membrane, and the pair of frames through cross-linking adhesion in which a gasket raw material is poured in the cavity to form a gasket covering at least a part of the pair of frames and the uncross-linked first cross-linking adhesive member is cross-linked. The term "uncross-linked" refers to a state before the cross-linking is completed. Specifically, not only a state where the cross-linking is yet to be started but also a state where the cross-linking has progressed to some degree is included.

The method for manufacturing a fuel cell according to the present aspect includes the sub-assembly arrangement step and the integration step. In the sub-assembly arrangement step, the sub-assembly is arranged in the cavity of the mold. The sub-assembly includes the MEA, the pair of frames, the pair of gas diffusion layers, and the first cross-linking adhesive member formed of uncross-linked rubber.

In the integration step, the gasket raw material is poured in the cavity, whereby the gasket is formed in a predetermined portion of the sub-assembly. In addition, the first cross-linking adhesive member is cross-linked. The first cross-linking adhesive member and the outer periphery portion of the electrolyte membrane are subjected to cross-linking adhesion. In addition, the first cross-linking adhesive member and the frames are subjected to cross-linking adhesion.

With the method for manufacturing a fuel cell according to the present aspect, a fuel cell having high sealability and adhesiveness between the outer periphery portion of the electrolyte membrane and the first cross-linking adhesive member can be easily manufactured. With the method for manufacturing a fuel cell according to the present aspect, a fuel cell having high sealability and adhesiveness between the pair of frames and the first cross-linking adhesive member can be easily manufactured. With the method for manufacturing a fuel cell according to the present aspect, the electrolyte membrane, i.e., the MEA, and the pair of frames can be firmly connected via the first cross-linking adhesive member.

(12) Preferably, according to a twelfth aspect of the present invention, in the method based on the method of (11) described above, the membrane accommodating portion of the uncross-linked first cross-linking adhesive member includes a second intermediate portion interposed between the outer periphery portion of the electrolyte membrane and an outer periphery portion of the gas diffusion layers in the sub-assembly arrangement step, and the uncross-linked first cross-linking adhesive member is cross-linked whereby the second intermediate portion, the outer periphery portion of the electrolyte membrane, and the outer periphery portion of the pair of gas diffusion layers are subjected to cross-linking adhesion in the integration step.

With this method, a fuel cell having high sealability and adhesiveness between the membrane accommodating portion of the first cross-linking adhesive member and the outer periphery portion of the gas diffusion layers can be easily manufactured. With this method, the electrolyte membrane, i.e., the MEA, and the gas diffusion layers can be firmly connected via the first cross-linking adhesive member.

(13) Preferably, according to a thirteenth aspect of the present invention, in the method based on the method of (11) or (12) described above, the sub-assembly further includes a second cross-linking adhesive member formed of uncross-linked rubber between the gasket and the frames in the sub-assembly arrangement step, and the uncross-linked second cross-linking adhesive member is cross-linked whereby the second cross-linking adhesive member, the gasket, and the frames are subjected to cross-linking adhesion in the integration step. The term "uncross-linked" refers to a state before the cross-linking is completed. That is, not only a state where the cross-linking is yet to be started but also a state where the cross-linking has progressed to some degree is also included.

With this method, a fuel cell having high sealability and adhesiveness between the gasket and the second cross-linking adhesive member and between the frames and the second cross-linking adhesive member can be easily manufactured. With this method, the gasket and the frames firmly be can connected via the second cross-linking adhesive member.

(14) Preferably, according to a fourteenth aspect of the present invention, in the method based on the method of any one of (11) to (13) described above, the electrolyte membrane is arranged so as not to be exposed in the cavity of the mold in the sub-assembly arrangement step.

In the integration step, the gasket raw material is poured in the cavity. At this time, if the electrolyte membrane is exposed in the cavity, the flow of the gasket raw material presses the electrolyte membrane. The rigidity of the electrolyte membrane itself is low. Further, the electrolyte membrane has a large linear expansion coefficient, and therefore tends to expand due to heat. Due to such factors, there is a possibility of the electrolyte membrane being shifted to one side in the surface extending direction or being deformed. That is, there is a possibility of the electrolyte membrane being displaced with respect to a predetermined position.

In contrast, in the method according to the present aspect, the electrolyte membrane is not exposed in the cavity. Therefore, the flow of the gasket raw material does not directly press the electrolyte membrane. It is thus less likely that the electrolyte membrane is displaced with respect to the predetermined position.

(15) Preferably, according to a fifteenth aspect of the present invention, in the method based on the method of (14) described above, a gap is formed between a frame inner periphery portion of the frames and the outer periphery portion of the gas diffusion layers, the electrolyte membrane includes a cavity exposed portion which is exposed in the cavity from the gap, and the first cross-linking adhesive member covers the cavity exposed portion in the sub-assembly arrangement step.

In this method, the first cross-linking adhesive member covers the cavity exposed portion of the electrolyte membrane. Therefore, the flow of the gasket raw material does not directly press the cavity exposed portion. The first cross-linking adhesive member is an elastic body. Therefore, even when the flow of the gasket raw material indirectly presses the cavity exposed portion via the first cross-linking adhesive member to deform the electrolyte membrane, the electrolyte membrane can recover to a predetermined shape by the elastic resilience of the first cross-linking adhesive member.

(16) Preferably, according to a sixteenth aspect of the present invention, in the method based on the method of (14) described above, no gap is formed between a frame inner periphery portion of the frames and the outer periphery portion of the gas diffusion layers in the sub-assembly arrangement step.

With this method, the electrolyte membrane is not exposed in the cavity from between the frame inner periphery portion of the frames and the outer periphery portion of the gas diffusion layers. Therefore, the flow of the gasket raw material does not directly press the electrolyte membrane.

(17) Preferably, according to a seventeenth aspect of the present invention, in the method based on the method of (16) described above, the outer periphery portion of the electrolyte membrane, the frame inner periphery portion of the frames, and the outer periphery portion of the gas diffusion layers are stacked outwardly from inside in the thickness direction, the membrane accommodating portion includes a third intermediate portion interposed between the outer periphery portion of the electrolyte membrane and the frame inner periphery portion of the frames, and the second cross-linking adhesive member is interposed between the frame inner periphery portion of the frames and the outer periphery portion of the gas diffusion layers, in the sub-assembly arrangement step.

With this method, a fuel cell having high sealability and adhesiveness between the third intermediate portion and the outer periphery portion of the electrolyte membrane can easily be manufactured. Also, a fuel cell having high sealability and adhesiveness between the third intermediate portion and the frame inner periphery portion of the frames can be easily manufactured. Also, a fuel cell having high sealability and adhesiveness between the second cross-linking adhesive member and the frame inner periphery portion of the frames can be easily manufactured. Also, a fuel cell having high sealability and adhesiveness between the second cross-linking adhesive member and the outer periphery portion of the gas diffusion layers can be easily manufactured. The electrolyte membrane and the frames can be firmly connected via the third intermediate portion. The frames and the gas diffusion layers can be firmly connected via the second cross-linking adhesive member.

According to some aspects of the present invention, a fuel cell and a fuel cell stack having high sealability and adhesiveness in an outer periphery portion of an electrolyte membrane can be provided. Also, according to some aspects of the present invention, a method for manufacturing a fuel cell by which a fuel cell having high sealability and adhesiveness in an outer periphery portion of an electrolyte membrane is easily manufactured can be provided.

BRIEF DESCRIPTION OF THE DRAWINGS

FIG. 3B is a sectional view along line B-B of FIG. 3A;

FIG. 6 is a schematic view of a second half of the step;

FIG. 12 is a partial sectional view of a related-art fuel cell;

DETAILED DESCRIPTION OF THE PREFERRED EMBODIMENTS

Embodiments of a fuel cell, a fuel cell stack, and a method for manufacturing a fuel cell of the present invention will be described below.

First Embodiment

Fuel Cell Stack

Figure 1:
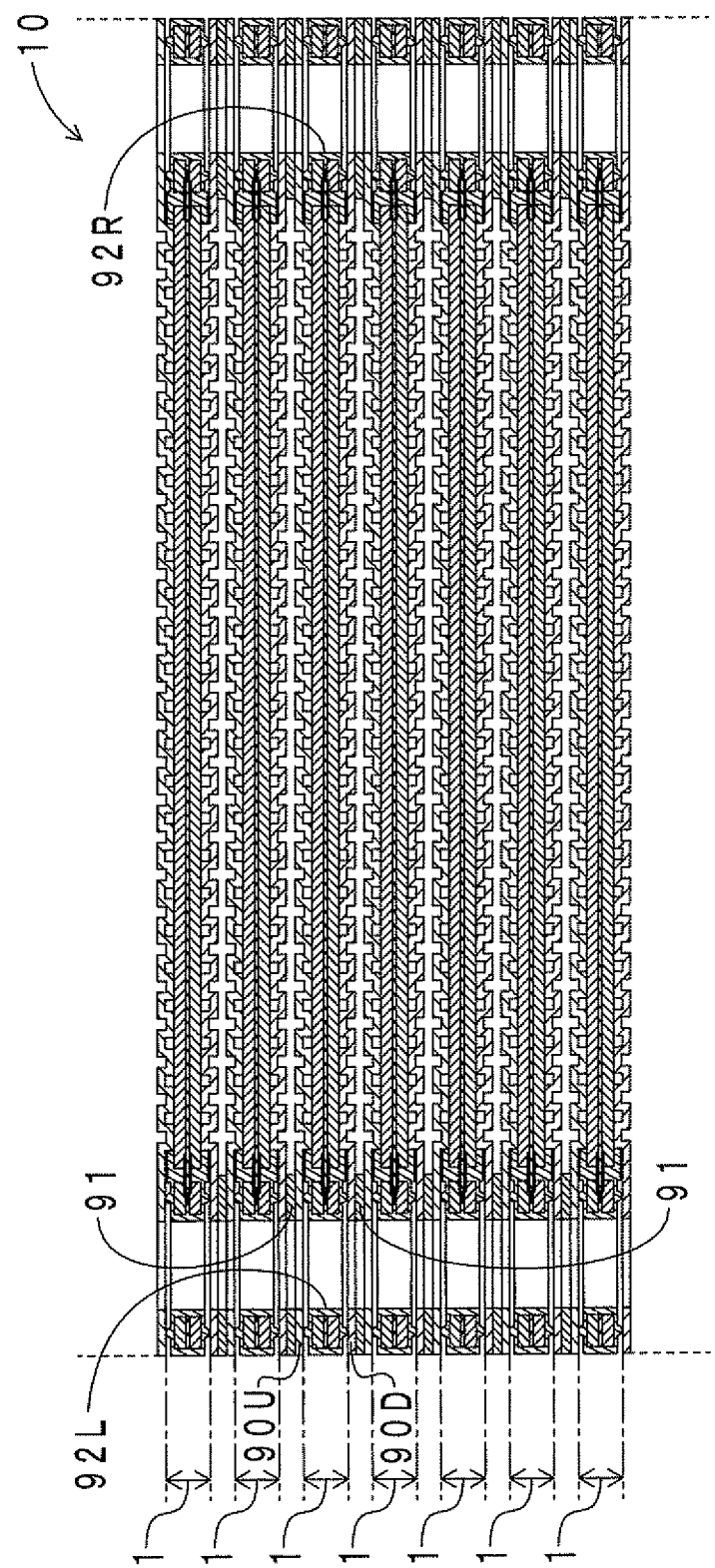
FIG. 1 is a partial sectional view of a fuel cell stack of a first embodiment of the present invention in the stacking direction.
Figure 2:
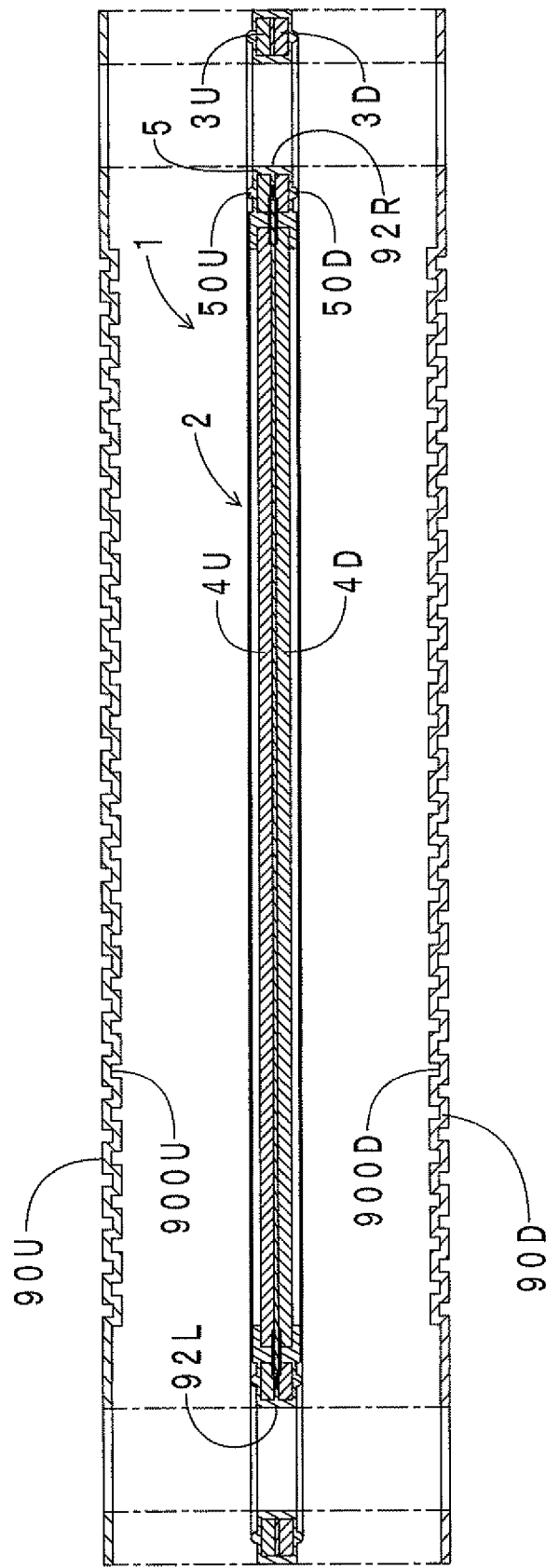
FIG. 2 is an exploded view of a fuel cell and a separator of the fuel cell stack.

The configuration of a fuel cell stack of this embodiment will now be described. FIG. 1 shows a partial sectional view of the fuel cell stack of this embodiment in the stacking direction. FIG. 2 shows an exploded view of a fuel cell and a separator of the fuel cell stack.

As shown in FIGS. 1 and 2, a fuel cell stack 10 of this embodiment includes a fuel cell 1, separators 90U and 90D, and an adhesive member 91. The configuration of the fuel cell 1 will be described later in detail.

The separator 90U is formed of metal, and has a rectangular thin plate shape with unevenness. Gas flow paths 900U are formed in the separator 90U by the uneven shape. The separator 90U is arranged above an arbitrary fuel cell 1 (specifically, above a gas diffusion layer 4U described later).

In a similar manner, the separator 90D is formed of metal, and has a rectangular thin plate shape with unevenness. Gas flow paths 900D are formed in the separator 90D by the uneven shape. The separator 90D is arranged below an arbitrary fuel cell 1 (specifically, below a gas diffusion layer 4D described later). That is, the arbitrary fuel cell 1 is sandwiched in the vertical direction by the pair of separators 90U and 90D. A number of unit structures of the separator 90U, the fuel cell 1, and the separator 90D are stacked in the vertical direction with adhesive members 91 formed of olefin thermoplastic resin therebetween.

On both ends of a stack in the stacking direction, a pair of end plates are arranged. The stack is fastened by the pair of end plates from both sides in the stacking direction. The fuel cell stack 10 has manifold holes 92L and 92R. The manifold holes 92L and 92R penetrate separator 90U and 90D and the fuel cell 1 to the stacking direction.

Fuel Cell

Figure 3A:
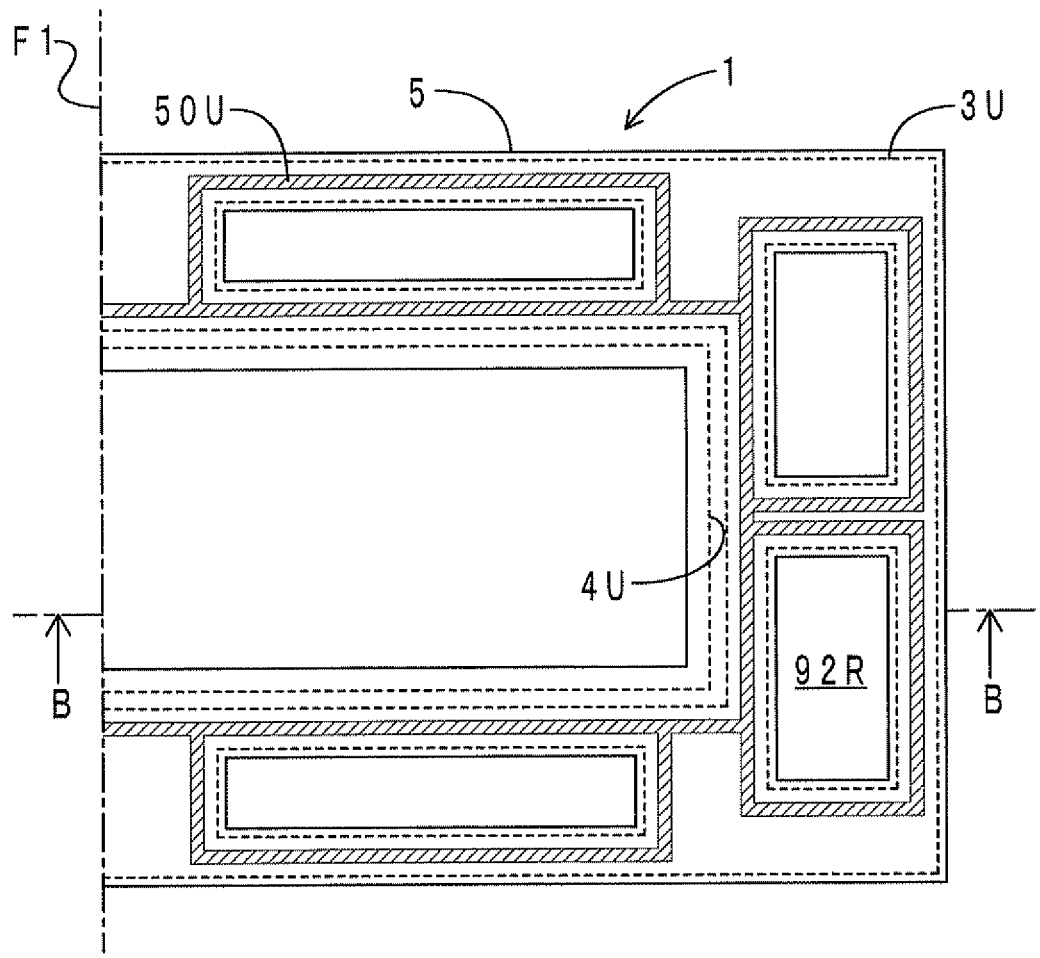
FIG. 3A is an upper surface view of the fuel cell.
Figure 4:
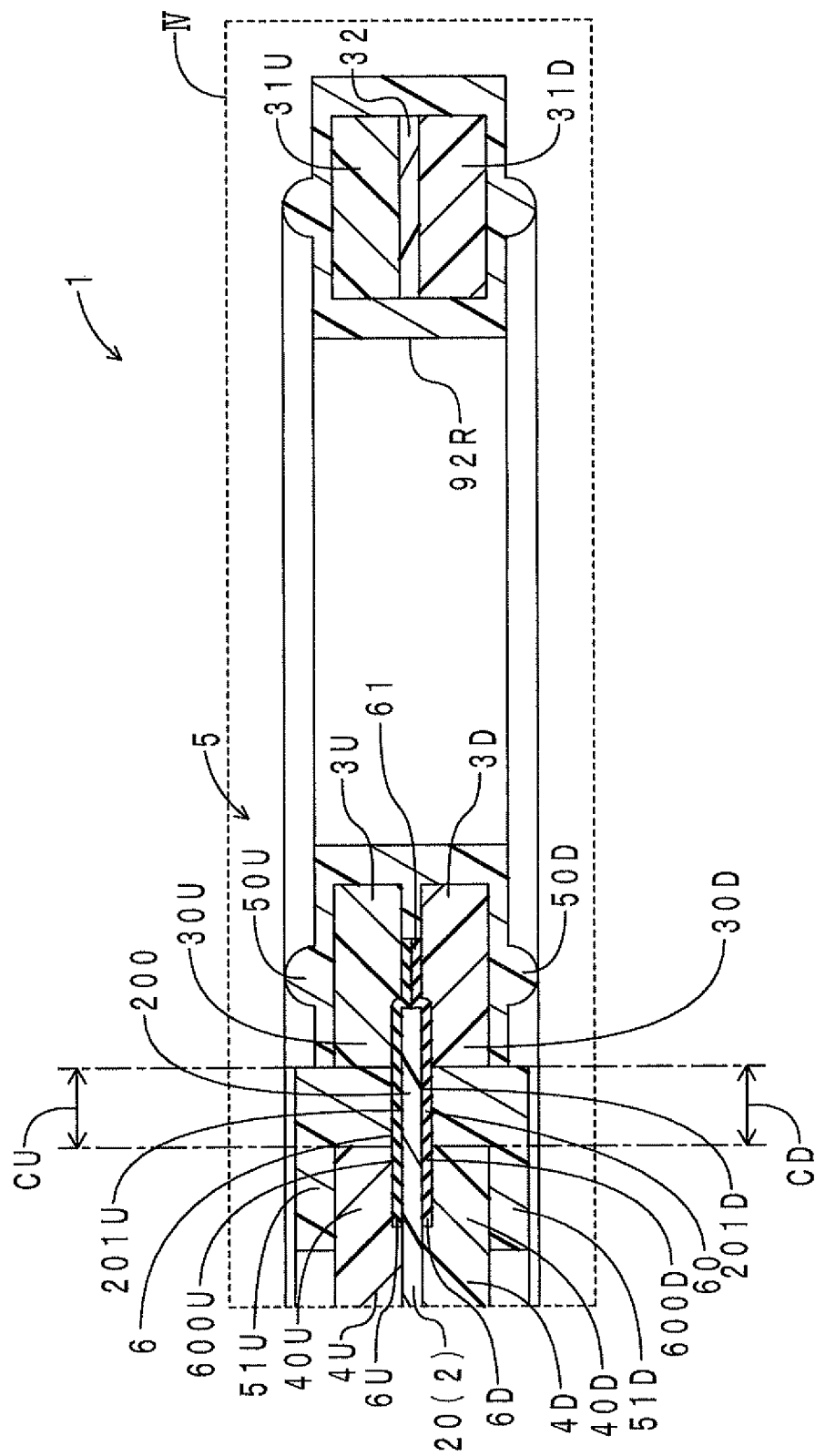
FIG. 4 is an enlarged view of a frame IV of FIG. 3B.

Next, the configuration of the fuel cell 1 of this embodiment will be described. FIG. 3A shows an upper surface view of the fuel cell of this embodiment. FIG. 3B shows a sectional view along line B-B of FIG. 3A. Note that FIGS. 3A and 3B show the right half portion of the fuel cell 1 with respect to a horizontal direction center plane F1. The fuel cell 1 is symmetric with respect to the horizontal direction center plane F1. FIG. 4 shows an enlarged view of a frame IV of FIG. 3B.

As shown in FIGS. 3A, 3B, and 4, the fuel cell 1 of this embodiment includes an MEA 2, a pair of frames 3U and 3D, a pair of gas diffusion layers 4U and 4D, a gasket 5, and a first cross-linking adhesive member 6.

The MEA 20 includes an electrolyte membrane 20 and a pair of electrodes (not shown). The electrolyte membrane 20 is an ion exchange membrane. The electrolyte membrane 20 is formed of fluororesin, and has a rectangular thin membrane shape. The electrolyte membrane 20 has proton conductivity.

The pair of electrodes are formed of platinum, and are applied on upper and lower surfaces of the electrolyte membrane 20. Note that the pair of electrodes are not applied on the upper and lower surfaces of an outer periphery portion 200 of the electrolyte membrane 20. A method of applying the electrode will be briefly described. First, carbon powder carrying platinum is dispersed in an appropriate organic solvent. Next, an appropriate amount of an electrolyte solution is added to the organic solvent dispersed with the carbon powder to prepare a paste. Then, the paste is screen-printed on the upper and lower surfaces of the electrolyte membrane 20. Thus, the pair of electrodes are applied to the upper and lower surfaces of the electrolyte membrane 20.

The pair of gas diffusion layers 4U and 4D are respectively formed of carbon cloth formed by weaving of carbon fiber. The pair of gas diffusion layers 4U and 4D respectively have rectangular sheet shapes. The gas diffusion layer 4U is arranged above the MEA 2. The gas diffusion layers 4D is arranged below the MEA 2.

The pair of frames 3U and 3D are respectively formed of olefin or ester resin, and have rectangular frame shapes. Between a frame inner periphery portion 30U of the frame 3U and a frame inner periphery portion 30D of the frame 3D, the outer periphery portion 200 of the electrolyte membrane 20 is indirectly sandwiched with the first cross-linking adhesive member 6 described later therebetween. The gas diffusion layer 4U is arranged inside the frame 3U. Between the frame inner periphery portion 30U of the frame 3U and an outer periphery portion 40U of the gas diffusion layer 4U, a gap CU is formed.

In a similar manner, the gas diffusion layers 4D is arranged inside the frame 3D. Between the frame inner periphery portion 30D of the frame 3D and an outer periphery portion 40D of the gas diffusion layers 4D, a gap CD is formed. An outer periphery portion 31U of the frame 3U and an outer periphery portion 31D of the frame 3D are connected via an adhesive member 32 formed of olefin thermoplastic resin.

The gasket 5 is formed of silicone rubber, and has a rectangular frame shape. The gasket 5 is arranged to cover the pair of frames 3U and 3D. The gasket 5 also extends inside the pair of frames 3U and 3D. The gasket 5 is present in the respective gaps CU and CD. The gasket 5 is integrally formed with ribs 50U (shaded in FIG. 3A for clear illustration) and 50D and holding frame portions 51U and 51D. The ribs 50U and 50D are arranged in the circumference of a hole such as the manifold hole 92R. The rib 50U is arranged above the frame 3U. In other words, the rib 50U is supported by the frame 3U from below. The rib 50D is arranged below the frame 3D. In other words, the rib 50D is supported by the frame 3D from above. As shown in FIG. 2, the rib 50U and the rib 50D are in elastic contact with a lower surface of the separator 90U and an upper surface of the separator 90D, respectively. Returning to FIGS. 3 and 4, the holding frame portion 51U is arranged above the outer periphery portion 40U of the gas diffusion layer 4U. The holding frame portion 51D is arranged below the outer periphery portion 40D of the gas diffusion layer 4D. That is, the pair of holding frame portions 51U and 51D hold the gas diffusion layers 4U and 4D in the vertical direction.

The first cross-linking adhesive member 6 is mounted between the outer periphery portion 200 of the electrolyte membrane 20 and the pair of gas diffusion layers 4U and 4D. Also, the first cross-linking adhesive member 6 is provided between the outer periphery portion 200 of the electrolyte membrane 20 and the gasket 5. Also, the first cross-linking adhesive member 6 is mounted between the outer periphery portion 200 of the electrolyte membrane 20 and the pair of frames 3U and 3D.

Specifically, the first cross-linking adhesive member 6 includes a pair of sheet members 6U and 6D. The pair of sheet members 6U and 6D are respectively formed of ethylene-propylene-diene rubber (EPDM), and have thin film shapes. The sheet member 6U is arranged in a rectangular frame shape to frame the upper surface of the outer periphery portion 200 of the electrolyte membrane 20. The sheet member 6D is arranged in a rectangular frame shape to frame the lower surface of the outer periphery portion 200 of the electrolyte membrane 20.

The first cross-linking adhesive member 6 includes a membrane accommodating portion 60 and a first intermediate portion 61. The membrane accommodating portion 60 and the first intermediate portion 61 are formed by the pair of sheet members 6U and 6D.

The membrane accommodating portion 60 has a pouch shape which is open toward the inside (left side in FIG. 4) in the surface extending direction (direction in which the surface extends approximately orthogonally with respect to the stacking direction of the fuel cell 1). A portion of the sheet member 6U forming an upper wall of the membrane accommodating portion 60 is disposed between the outer periphery portion 200 of the electrolyte membrane 20 and the outer periphery portion 40U of the gas diffusion layer 4U, between the outer periphery portion 200 and the gasket 5, and between the outer periphery portion 200 and the frame inner periphery portion 30U of the frame 3U in the order from the inside to the outside in the surface extending direction (left to right in FIG. 4). In other words, the sheet member 6U is subjected to cross-linking adhesion with the outer periphery portion 200 of the electrolyte membrane 20, the outer periphery portion 40U of the gas diffusion layer 4U, the gasket 5, and the frame inner periphery portion 30U of the frame 3U. The portion of the sheet member 6U between the outer periphery portion 200 of the electrolyte membrane 20 and the outer periphery portion 40U of the gas diffusion layer 4U is a second intermediate portion 600U.

In a similar manner, a portion of the sheet member 6D forming a lower wall of the membrane accommodating portion 60 is disposed between the outer periphery portion 200 of the electrolyte membrane 20 and the outer periphery portion 40D of the gas diffusion layer 4D, between the outer periphery portion 200 and the gasket 5, and between the outer periphery portion 200 and the frame inner periphery portion 30D of the frame 3D in the order from the inside to the outside in the surface extending direction. In other words, the sheet member 6D is subjected to cross-linking adhesion with the outer periphery portion 200 of the electrolyte membrane 20, the outer periphery portion 40D of the gas diffusion layer 4D, the gasket 5, and the frame inner periphery portion 30D of the frame 3D. The portion of the sheet member 6D between the outer periphery portion 200 of the electrolyte membrane 20 and the outer periphery portion 40D of the gas diffusion layer 4D is a second intermediate portion 600D.

The first intermediate portion 61 is arranged outside the membrane accommodating portion 60 in the surface extending direction. The first intermediate portion 61 is interposed between the pair of frames 3U and 3D. Portions of the sheet members 6U and 6D forming the first intermediate portion 61 are subjected to cross-linking adhesion with the pair of frames 3U and 3D. The portions of the sheet members 6U and 6D forming the first intermediate portion 61 are subjected to cross-linking adhesion with each other. Therefore, the membrane accommodating portion 60 is sealed from the outside in the surface extending direction.

Method for Manufacturing Fuel Cell

Figure 5:
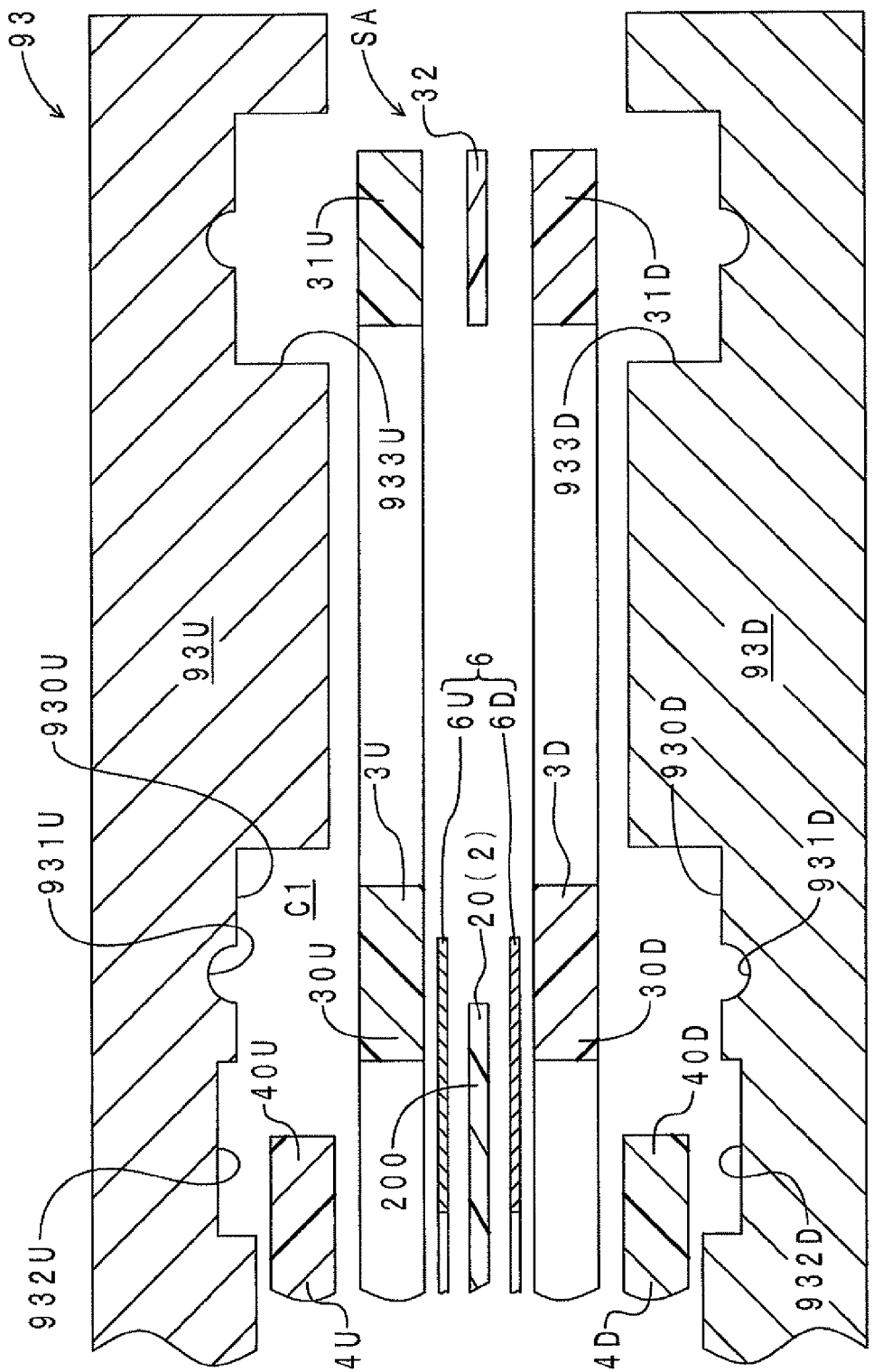
FIG. 5 is a schematic view of a first half of a sub-assembly arrangement step of a method for manufacturing the fuel cell.
Figure 7:
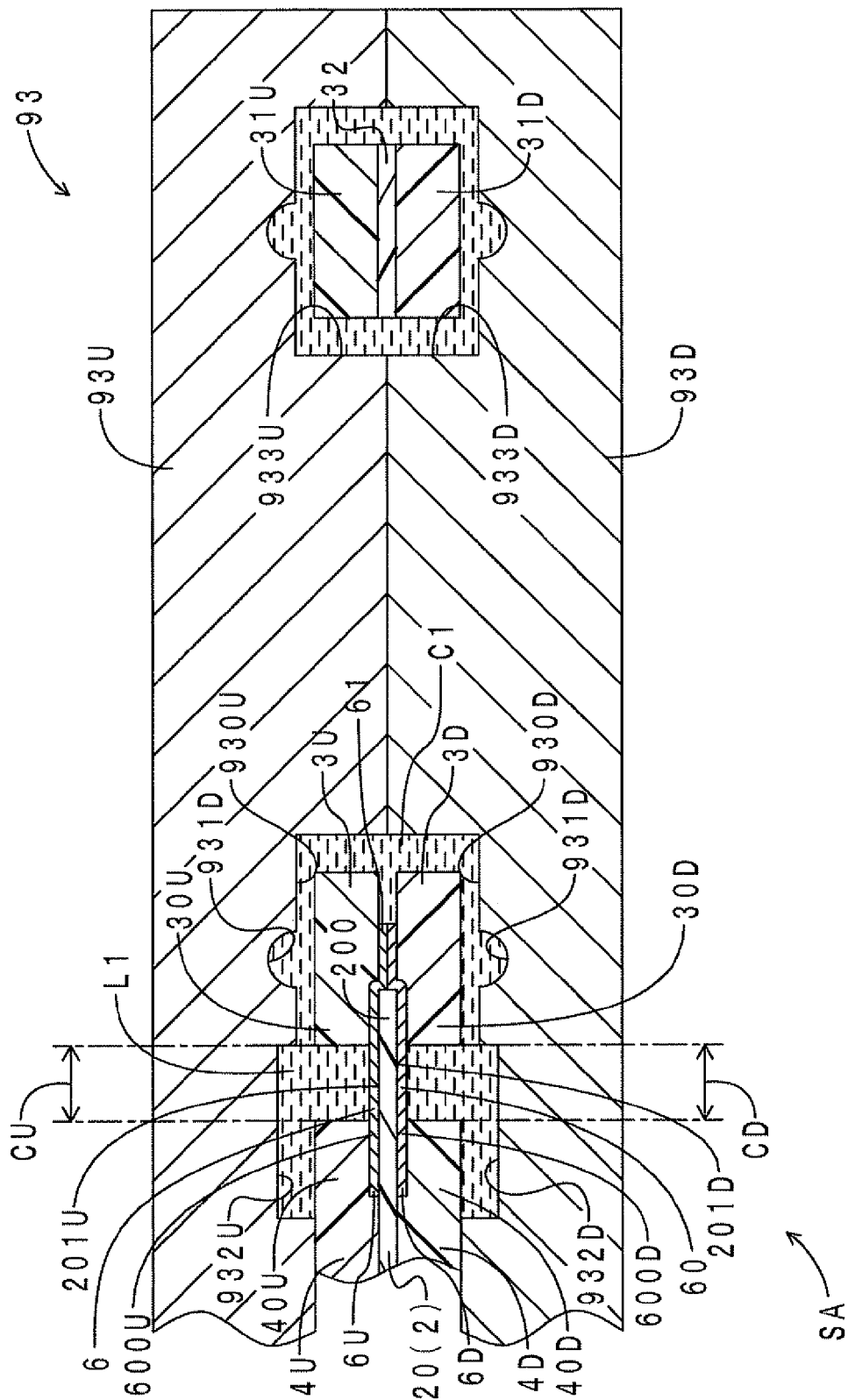
FIG. 7 is a schematic view of an integration step of the method for manufacturing the fuel cell.

Next, a method for manufacturing the fuel cell 1 of this embodiment will be described. The method for manufacturing the fuel cell 1 of this embodiment includes a sub-assembly arrangement step and an integration step. FIG. 5 shows a schematic view of a first half of the sub-assembly arrangement step of the method for manufacturing the fuel cell of this embodiment. FIG. 6 shows a schematic view of a second half of the step. FIG. 7 shows a schematic view of an integration step of the method for manufacturing the fuel cell of this embodiment. Note that FIG. 5 and the subsequent drawings all show a portion of the fuel cell 1 corresponding to the area inside the frame IV of FIG. 4.

In the sub-assembly arrangement step, as shown in FIG. 5, a sub-assembly SA is first arranged in a cavity C1 of a metal mold 93. The sub-assembly SA includes the MEA 2, the pair of frames 3U and 3D, the gas diffusion layers 4U and 4D, the first cross-linking adhesive member 6, and the adhesive member 32. Note that the sheet members 6U and 6D constituting the first cross-linking adhesive member 6 are in an uncross-linked state.

The cavity C1 has a shape corresponding to the gasket 5 of FIG. 4. That is, in a mold surface 930U of an upper mold 93U of the metal mold 93, a rib indentation portion 931U corresponding to the rib 50U of FIG. 4 is provided. The mold surface 930U is provided with a holding frame portion indentation portion 932U corresponding to the holding frame portion 51U of FIG. 4. The mold surface 930U is also provided with a manifold hole protrusion portion 933U corresponding to the manifold hole 92R of FIG. 4.

In a similar manner, in a mold surface 930D of a lower mold 93D of the metal mold 93, a rib indentation portion 931D corresponding to the rib 50D of FIG. 4 is provided. The mold surface 930D is provided with a holding frame portion indentation portion 932D corresponding to the holding frame portion 51D of FIG. 4. The mold surface 930D is also provided with a manifold hole protrusion portion 933D corresponding to the manifold hole 92R of FIG. 4.

In this step, mold clamping of the metal mold 93 is performed following the arrangement of the sub-assembly SA. As shown in FIG. 6, the mold clamping causes the manifold hole protrusion portion 933U of the upper mold 93U and the manifold hole protrusion portion 933D of the lower mold 93D to make contact. The adhesive member 32 is sandwiched by the pair of frames 3U and 3D in the vertical direction. In a similar manner, the sheet members 6U and 6D are sandwiched by the pair of frames 3U and 3D in the vertical direction. In an inside portion in the surface extending direction between the pair of sheet members 6U and 6D, the outer periphery portion 200 of the electrolyte membrane 20 is provided. Therefore, the outer periphery portion 200 of the electrolyte membrane 20 is also sandwiched by the pair of frames 3U and 3D in the vertical direction via the sheet members 6U and 6D, respectively. The membrane accommodating portion 60 and the first intermediate portion 61 are formed by the first cross-linking adhesive member 6 being sandwiched by the pair of frames 3U and 3D in this manner.

Note that a cavity exposed portion 201U and a cavity exposed portion 201D are respectively formed in the gap CU portion of the upper surface of the outer periphery portion 200 of the electrolyte membrane 20 and the gap CD portion of the lower surface of the outer periphery portion 200. However, the cavity exposed portions 201U and 201D are accommodated in the membrane accommodating portion 60. Therefore, the cavity exposed portions 201U and 201D are not exposed in the cavity C1.

An upper surface of the gas diffusion layer 4U is pressed from above by the mold surface 930U of the upper mold 93U. In a similar manner, a lower surface of the gas diffusion layer 4D is pressed from below by the mold surface 930D of the lower mold 93D. Therefore, the second intermediate portion 600U is sandwiched in the vertical direction by the outer periphery portion 200 of the electrolyte membrane 20 and the outer periphery portion 40U of the gas diffusion layer 4U. In a similar manner, the second intermediate portion 600D is sandwiched in the vertical direction by the outer periphery portion 200 of the electrolyte membrane 20 and the outer periphery portion 40D of the gas diffusion layer 4D.

In the integration step, as shown in FIG. 7, a gasket raw material L1 in a liquid state is first poured in the cavity C1 of the metal mold 93 which is heated to a predetermined temperature. The gasket raw material L1 spreads in the cavity C1. The adhesive member 32 softens. Cross-linking reactions occur in the sheet members 6U and 6D.

In this step, the metal mold 93 is subsequently cooled. When the metal mold 93 is cooled, the gasket raw material L1 hardens, whereby the gasket 5 shown in FIG. 4 is integrally formed. Also, the adhesive member 32 hardens, whereby the outer periphery portion 31U of the frame 3U, the adhesive member 32, and the outer periphery portion 31D of the frame 3D are firmly adhered. The sheet member 6U and the outer periphery portion 200 of the electrolyte membrane 20, the sheet member 6U and the outer periphery portion 40U of the gas diffusion layer 4U, the sheet member 6U and the gasket raw material L1 filled in the gap CU, the sheet member 6U and the frame 3U, the sheet member 6D and the outer periphery portion 200 of the electrolyte membrane 20, the sheet member 6D and the outer periphery portion 40D of the gas diffusion layer 4D, the sheet member 6D and the gasket raw material L1 filled in the gap CD, the sheet member 6D and the frame 3D, and the sheet member 6D and the sheet member 6U are respectively subjected to firm cross-linking adhesion. The fuel cell 1 of this embodiment shown in FIG. 4 is thus manufactured.

Advantageous Effects

Next, advantageous effects of the fuel cell 1, the fuel cell stack 10, and the method for manufacturing the fuel cell 1 of this embodiment will be described. In the fuel cell 1 of this embodiment, the outer periphery portion 200 of the electrolyte membrane 20 is accommodated in the membrane accommodating portion 60 of the first cross-linking adhesive member 6. Therefore, an external leak of a product due to decomposition of the electrolyte membrane 20, such as a fluoride and a sulfonic acid, via an end surface of the outer periphery portion 200 of the electrolyte membrane 20 can be suppressed. The outer periphery portion 200 of the electrolyte membrane 20 is subjected to cross-linking adhesion with the first cross-linking adhesive member 6. Therefore, the outer periphery portion 200 of the electrolyte membrane 20 hardly falls from the membrane accommodating portion 60 of the first cross-linking adhesive member 6. In this manner, the fuel cell 1 of this embodiment has high sealability and adhesiveness between the outer periphery portion 200 of the electrolyte membrane 20 and the first cross-linking adhesive member 6.

The first intermediate portion 61 of the first cross-linking adhesive member 6 is arranged between the pair of frames 3U and 3D. In addition, the pair of frames 3U and 3D are subjected to cross-linking adhesion with the first cross-linking adhesive member 6. Therefore, the fuel cell 1 of this embodiment has high sealability and adhesiveness between the pair of frames 3U and 3D and the first cross-linking adhesive member 6. In the first intermediate portion 61, the pair of sheet members 6U and 6D are subjected to cross-linking adhesion with each other. Therefore, the first intermediate portion 61 itself has high sealability and adhesiveness.

The first cross-linking adhesive member 6 is formed of EPDM. Therefore, softening due to heat does not occur. It is thus unlikely that the first cross-linking adhesive member 6 softens and separates from the outer periphery portion 200 of the electrolyte membrane 20 due to heat, unlike in the thermoplastic resin layer of the annular ribbon of the fuel cell of Japanese Patent Application Publication No. JP-A-2007-157420 mentioned above.

The first cross-linking adhesive member 6 is formed of EPDM, and therefore is highly water-repellent. Thus, moisture hardly reaches an adhesion boundary surface between the outer periphery portion 200 of the electrolyte membrane 20 and the first cross-linking adhesive member 6, an adhesion boundary surface between the pair of frames 3U and 3D and the first cross-linking adhesive member 6, and the portions of the pair of sheet members 6U and 6D constituting the first intermediate portion 61.

The first cross-linking adhesive member 6 is formed of EPDM, and therefore has a wide elastic deformation region. Thus, the first cross-linking adhesive member 6 can easily follow swelling and shrinkage deformation of the electrolyte membrane 20. Also, the difference in deformation amount between the electrolyte membrane 20 and the pair of frames 3U and 3D can easily be offset. The sealability and the adhesiveness between the outer periphery portion 200 of the electrolyte membrane 20 and the first cross-linking adhesive member 6 are hardly degraded in this regard as well. In the fuel cell 1 of this embodiment, the electrolyte membrane 20, i.e., the MEA 2, and the pair of frames 3U and 3D can firmly be connected via the first cross-linking adhesive member 6.

In the fuel cell 1 of this embodiment, the second intermediate portions 600U and 600D are arranged between the outer periphery portion 200 of the electrolyte membrane 20 and the outer periphery portions 40U and 40D of the gas diffusion layers 4U and 4D. Therefore, the sealability and the adhesiveness between the membrane accommodating portion 60 of the first cross-linking adhesive member 6 and the outer periphery portions 40U and 40D of the gas diffusion layers 4U and 4D are high.

The first cross-linking adhesive member 6 is formed of EPDM, and therefore is not softened by heat. It is thus less likely that the membrane accommodating portion 60 of the first cross-linking adhesive member 6 is separated from the outer periphery portions 40U and 40D of the gas diffusion layers 4U and 4D due to heat.

The first cross-linking adhesive member 6 is formed of EPDM, and therefore is highly water-repellent. Thus, moisture hardly reaches an adhesion boundary surface between the membrane accommodating portion 60 of the first cross-linking adhesive member 6 and the outer periphery portions 40U and 40D of the gas diffusion layers 4U and 4D.

The first cross-linking adhesive member 6 is formed of EPDM, and therefore has a wide elastic deformation region. Thus, the first cross-linking adhesive member 6 can easily offset the difference in deformation amount between the electrolyte membrane 20 and the gas diffusion layers 4U and 4D. In the fuel cell 1 of this embodiment, the electrolyte membrane 20, i.e., the MEA 2, and the gas diffusion layers 4U and 4D can firmly be connected via the first cross-linking adhesive member 6.

In the fuel cell 1 of this embodiment, the gasket 5 integrally includes the holding frame portions 51U and 51D which hold the outer periphery portions 40U and 40D of the gas diffusion layers 4U and 4D from the outside in the thickness direction (stacking direction of the fuel cell 1). Therefore, the gas diffusion layers 4U and 4D and the MEA 2 are hardly separated.

In the fuel cell 1 of this embodiment, the ribs 50U and 50D of the gasket 5 are arranged outside the frames 3U and 3D in the thickness direction. By the ribs 50U and 50D making elastic contact with the separators 90U and 90D, the sealability between the fuel cell 1 and the separators 90U and 90D can be ensured.

As shown in FIG. 12, the electrolyte membrane 101a is arranged inside the rib 102d of the fuel cell 100 of the Japanese Patent Application Publication No. JP-A-2002-260693 in the thickness direction. Therefore, the reaction force due to the rib 102d making elastic contact with an opponent member tends to be applied to the electrolyte membrane 101a. The rib 102d is formed of rubber, and therefore tends to elastically deform. Therefore, the elastic force on the opponent member tends to be small.

In contrast, the ribs 50U and 50D of the fuel cell 1 of this embodiment are arranged outside the frames 3U and 3D in the thickness direction. That is, the ribs 50U and 50D are supported by the frames 3U and 3D from the inside in the thickness direction. The frames 3U and 3D have higher rigidity than the gasket 5. Therefore, in the fuel cell 1 of this embodiment, the elastic force on the separators 90U and 90D hardly becomes small. The frames 3U and 3D are interposed between the ribs 50U and 50D and the outer periphery portion 200 of the electrolyte membrane 20. Therefore, the reaction force due to the ribs 50U and 50D making elastic contact with the separators 90U and 90D is hardly applied to the outer periphery portion 200 of the electrolyte membrane 20.

As shown in FIG. 12, the rib 102d is subjected to compression deformation in the thickness direction when the rib 102d of the fuel cell 100 of the Japanese Patent Application Publication No. JP-A-2002-260693 makes elastic contact with the opponent member. In addition, the rib 102d is subjected to stretching deformation in the surface extending direction so as to expand the surface extending direction gap C101. The electrode 101b is adhered to the inner side of the rib 102d in the surface extending direction. On the other hand, the elastic layer 102a and a shape preservation layer 102b are adhered to the outer side of the rib 102d in the surface extending direction. Therefore, when the rib 102d is deformed, there is a possibility of the rib 102d and the electrode 101b, or the rib 102d and the elastic layer 102a as well as the shape preservation layer 102b being separated.

In contrast, the ribs 50U and 50D of the fuel cell 1 of this embodiment are formed integrally with the gasket 5 at the time of forming the gasket 5 (see FIG. 7). It is therefore less likely that the ribs 50U and 50D fall from the gasket 5 even when the ribs 50U and 50D are deformed.

In the fuel cell 1 of this embodiment, the MEA 2, the pair of frames 3U and 3D, the pair of gas diffusion layers 4U and 4D, the gasket 5, and the first cross-linking adhesive member 6 are integrated. Therefore, the fuel cell stack 10 of this embodiment is easily assembled. Also, the assembly error is small.

In the method for manufacturing the fuel cell 1 of this embodiment, the fuel cell 1 having high sealability and adhesiveness between the outer periphery portion 200 of the electrolyte membrane 20 and the first cross-linking adhesive member 6 can be easily manufactured by a simple procedure of arranging the sub-assembly SA in the cavity C1 (sub-assembly arrangement step) and heating while pouring the gasket raw material L1 in the cavity C1 (integration step).

With the method for manufacturing the fuel cell 1 of this embodiment, the fuel cell 1 having high sealability and adhesiveness between the pair of frames 3U and 3D and the first cross-linking adhesive member 6 can be easily manufactured. With the method for manufacturing the fuel cell 1 of this embodiment, the electrolyte membrane 20, i.e., the MEA 2, and the pair of frames 3U and 3D can be firmly connected via the first cross-linking adhesive member 6.

With the method for manufacturing the fuel cell 1 of this embodiment, the fuel cell 1 having high sealability and adhesiveness between the membrane accommodating portion 60 of the first cross-linking adhesive member 6 and the outer periphery portions 40U and 40D of the gas diffusion layers 4U and 4D can be easily manufactured by providing and cross-linking the second intermediate portions 600U and 600D. With the method for manufacturing the fuel cell 1 of this embodiment, the electrolyte membrane 20, i.e., the MEA 2, and the gas diffusion layers 4U and 4D can be firmly connected via the first cross-linking adhesive member 6.

In the method for manufacturing the fuel cell 1 of this embodiment, the first cross-linking adhesive member 6 covers the cavity exposed portions 201U and 201D of the electrolyte membrane 20 (see FIG. 6) in the sub-assembly arrangement step. Therefore, in the integration step, the flow of the gasket raw material L1 does not directly press the cavity exposed portions 201U and 201D. The first cross-linking adhesive member 6 is an elastic body. Therefore, even when the flow of the gasket raw material L1 indirectly presses the cavity exposed portions 201U and 201D via the first cross-linking adhesive member 6 to deform the electrolyte membrane 20, the electrolyte membrane 20 can recover to a pre-determined shape by the elastic resilience of the first cross-linking adhesive member 6. Also, it is less likely that the electrolyte membrane 20 falls from between the pair of frames 3U and 3D due to the flow of the gasket raw material L1.

Second Embodiment

A difference of a fuel cell of this embodiment from the fuel cell of the first embodiment is that the volume of the gasket is small. Thus, only the difference will be described here.

Figure 8:
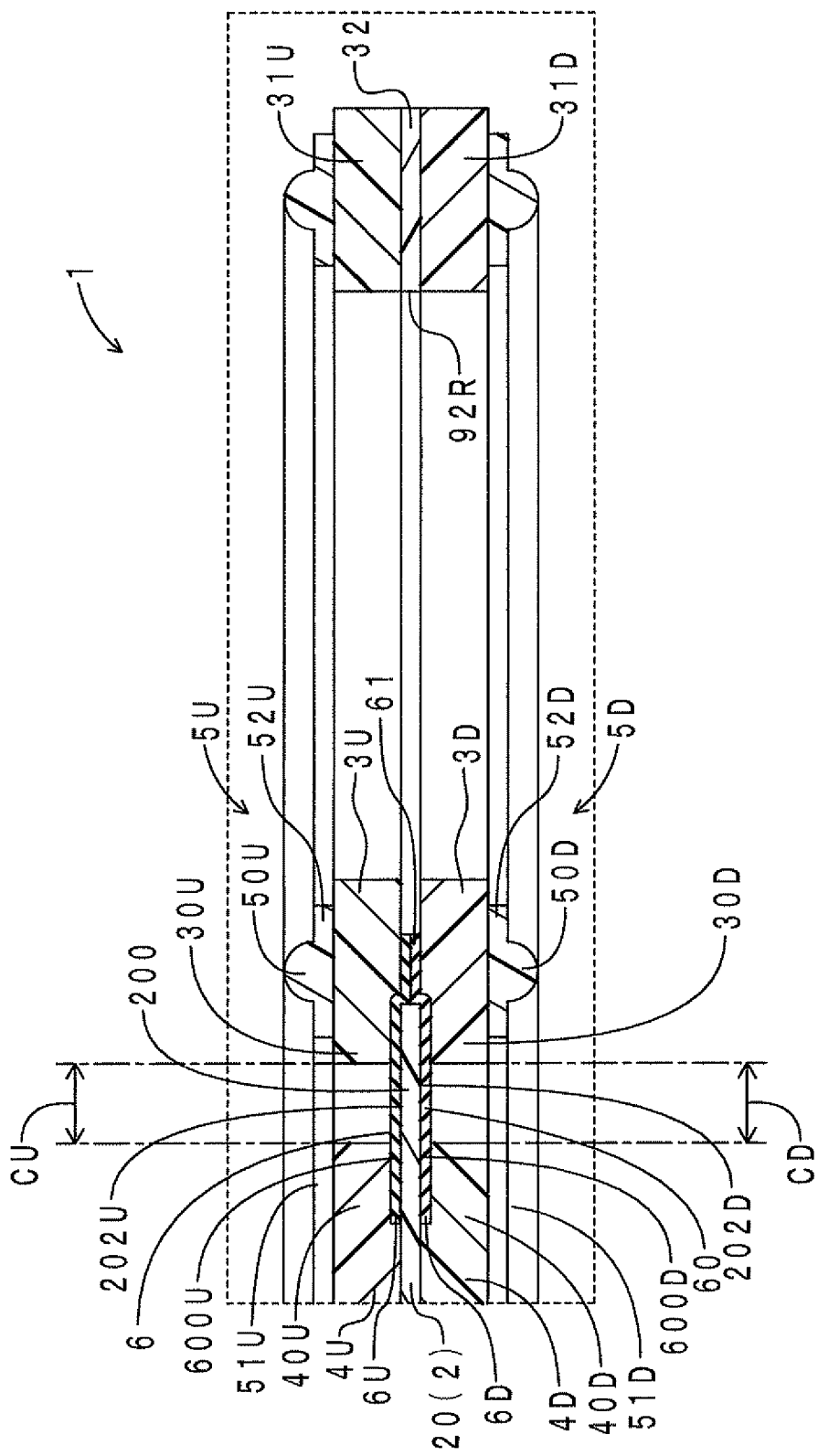
FIG. 8 is a partial sectional view of a fuel cell of a second embodiment of the present invention in the thickness direction.

FIG. 8 shows a partial sectional view in the thickness direction of the fuel cell of this embodiment. Note that portions corresponding to those of FIG. 4 are denoted by the same reference symbols. As shown in FIG. 8, gaskets 5U and 5D are not integrated, but are independent from each other. The gasket 5U is arranged on an upper surface of the frame 3U. The gasket 5U has the rib 50U and a base portion 52U. The base portion 52U is secured to the upper surface of the frame 3U. The rib 50U is provided so as to protrude upward from the base portion 52U. In a similar manner, the gasket 5D is arranged on a lower surface of the frame 3D. The gasket 5D has the rib 50D and a base portion 52D. The base portion 52D is secured to the lower surface of the frame 3D. The rib 50D is provided so as to protrude downward from the base portion 52D.

The gaskets 5U and 5D are not present in the gaps CU and CD. However, an exposed portion 202U on the upper surface of the outer periphery portion 200 of the electrolyte membrane 20 is covered by the sheet member 6U. Therefore, the exposed portion 202U is not exposed to the outside of the sheet member 6U from the gap CU. In a similar manner, an exposed portion 202D on the lower surface of the outer periphery portion 200 of the electrolyte membrane 20 is covered by the sheet member 6D. Therefore, the exposed portion 202D is not exposed to the outside of the sheet member 6D from the gap CD.

Figure 9:
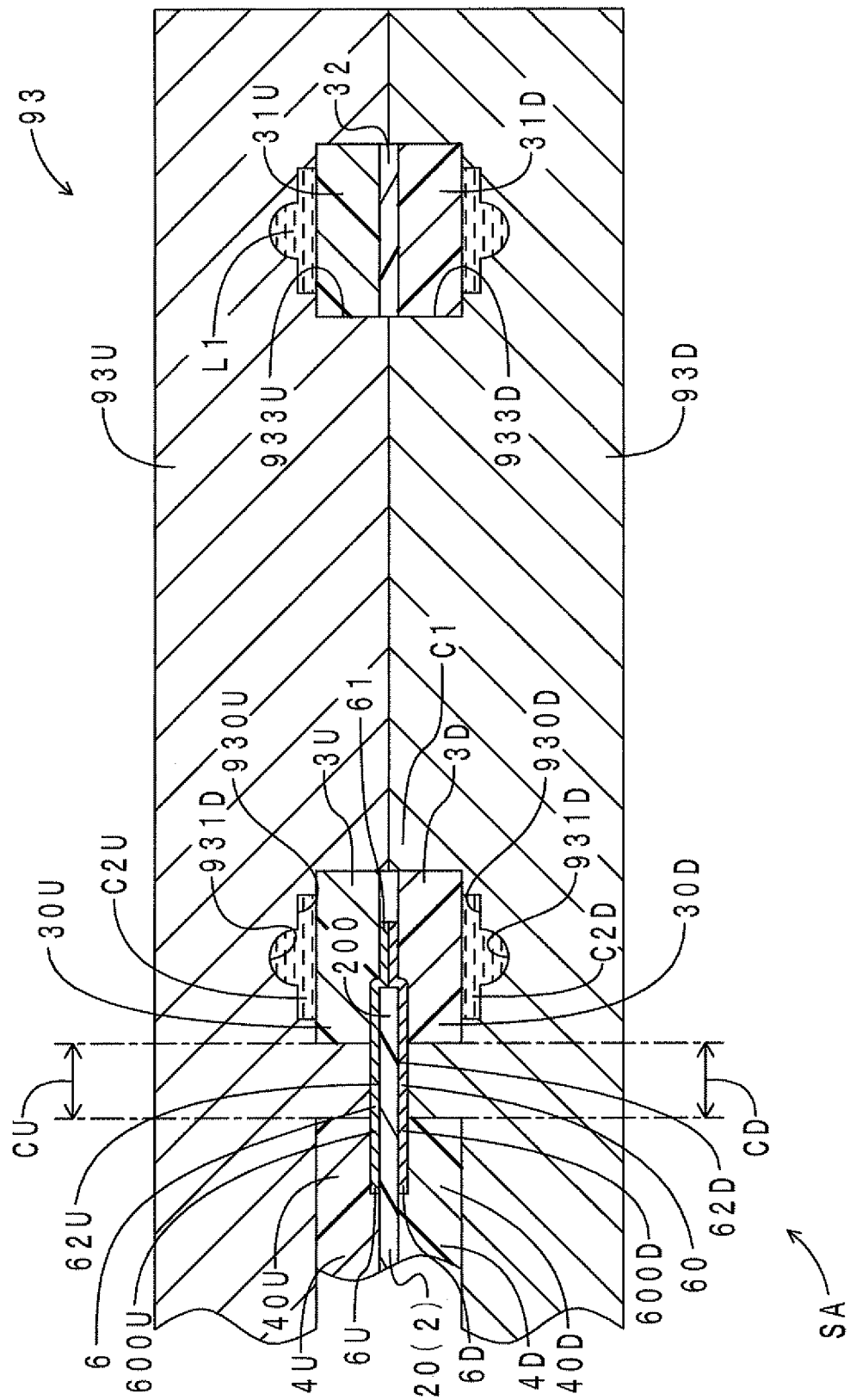
FIG. 9 is a schematic view of an integration step of a method for manufacturing the fuel cell.

FIG. 9 shows a schematic view of an integration step of a method for manufacturing the fuel cell of this embodiment. Note that portions corresponding to those of FIG. 7 are denoted by the same reference symbols. As shown in FIG. 9, an upper cavity C2U and a lower cavity C2D are separately and individually arranged in the metal mold 93. The cavity C2U has a shape corresponding to the gasket 5U of FIG. 8. The cavity C2D has a shape corresponding to the gasket 5D of FIG. 8. In the integration step, the gaskets 5U and 5D of FIG. 8 are formed by pouring the gasket raw material L1 in the cavities C2U and C2D.

The fuel cell, a fuel cell stack, and the method for manufacturing a fuel cell of this embodiment have advantageous effects similar to those of the fuel cell, the fuel cell stack, and the method for manufacturing a fuel cell of the first embodiment regarding portions having common configurations.

The first cross-linking adhesive member 6 is formed of EPDM, and therefore is highly water-repellent. Thus, moisture hardly reaches the adhesion boundary surface between the outer periphery portion 200 of the electrolyte membrane 20 and the first cross-linking adhesive member 6, the adhesion boundary surface between the pair of frames 3U and 3D and the first cross-linking adhesive member 6, and the adhesion boundary surface of the pair of gas diffusion layers 4U and 4D and the first cross-linking adhesive member 6. Therefore, it is less likely that the electrolyte membrane 20 is degraded by moisture even if the gaps CU and CD are not intentionally sealed by the gaskets 5U and 5D, as in the fuel cell of this embodiment. Since the gaps CU and CD do not need to be sealed, the usage amount of the gasket raw material L1 can be reduced in the method for manufacturing a fuel cell of this embodiment. Thus, the manufacturing cost of the fuel cell can be reduced.

In the fuel cell of this embodiment, the exposed portions 202U and 202D of the electrolyte membrane 20 are covered by the first cross-linking adhesive member 6. Therefore, an external leak of a product due to decomposition of the electrolyte membrane 20, such as a fluoride and a sulfonic acid, via the exposed portions 202U and 202D can be suppressed.

Third Embodiment

A difference of a fuel cell of this embodiment from the fuel cell of the first embodiment is that the volume of the gasket is small. Another difference is that a second cross-linking adhesive member is arranged between the frame and the gasket. Thus, only the differences will be described here.

Figure 10:
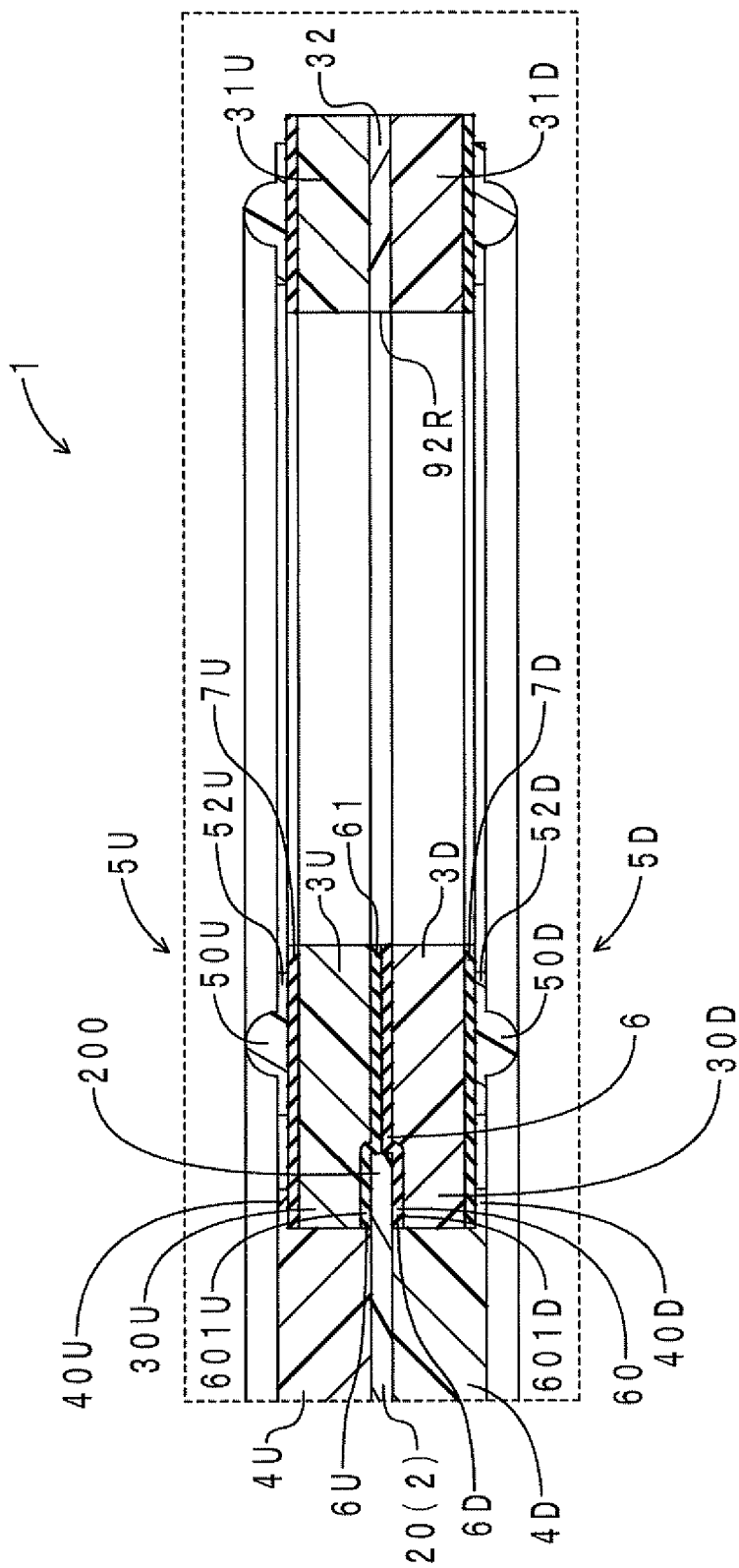
FIG. 10 is a partial sectional view of a fuel cell of a third embodiment of the present invention in the thickness direction.

FIG. 10 shows a partial sectional view in the thickness direction of the fuel cell of this embodiment. Note that portions corresponding to those of FIG. 4 are denoted by the same reference symbols. As shown in FIG. 10, the sheet member 6U and a second cross-linking adhesive member 7U are subjected to cross-linking adhesion with a lower surface of the frame 3U and the upper surface of the frame 3U, respectively. The second cross-linking adhesive member 7U is formed of EPDM, and is arranged on the entire upper surface of the frame 3U. In addition, the sheet member 6D and a second cross-linking adhesive member 7D are arranged on an upper surface of the frame 3D and the lower surface of the frame 3D, respectively. The second cross-linking adhesive member 7D is formed of EPDM, and is arranged on the entire lower surface of the frame 3D.

The membrane accommodating portion 60 includes third intermediate portions 601U and 601D. The third intermediate portion 601U is interposed between the outer periphery portion 200 of the electrolyte membrane 20 and the frame inner periphery portion 30U of the frame 3U. The third intermediate portion 601 is interposed between the outer periphery portion 200 of the electrolyte membrane 20 and the frame inner periphery portion 30D of the frame 3D.

The outer periphery portion 200 of the electrolyte membrane 20, the frame inner periphery portions 30U and 30D of the frames 3U and 3D, and the outer periphery portions 40U and 40D of the gas diffusion layers 4U and 4D are stacked in the thickness direction. The third intermediate portions 601U and 601D are interposed between the outer periphery portion 200 of the electrolyte membrane 20 and the frame inner periphery portions 30U and 30D of the frames 3U and 3D. Frame inner periphery portions of the second cross-linking adhesive members 7U and 7D are interposed between the frame inner periphery portions 30U and 30D of the frames 3U and 3D and the outer periphery portions 40U and 40D of the gas diffusion layers 4U and 4D.

The gaskets 5U and 5D are not integrated, but are independent from each other in a similar manner to those in the second embodiment. The gasket 5U is arranged on an upper surface of the second cross-linking adhesive member 7U. The gasket 5U has the rib 50U and the base portion 52U. The base portion 52U is subjected to cross-linking adhesion with the upper surface of the second cross-linking adhesive member 7U. The rib 50U is provided so as to protrude upward from the base portion 52U.

In a similar manner, the gasket 5D is arranged on a lower surface of the second cross-linking adhesive member 7D. The gasket 5D has the rib 50D and the base portion 52D. The base portion 52D is subjected to cross-linking adhesion with the lower surface of the second cross-linking adhesive member 7D. The rib 50D is provided so as to protrude downward from the base portion 52D.

Figure 11:
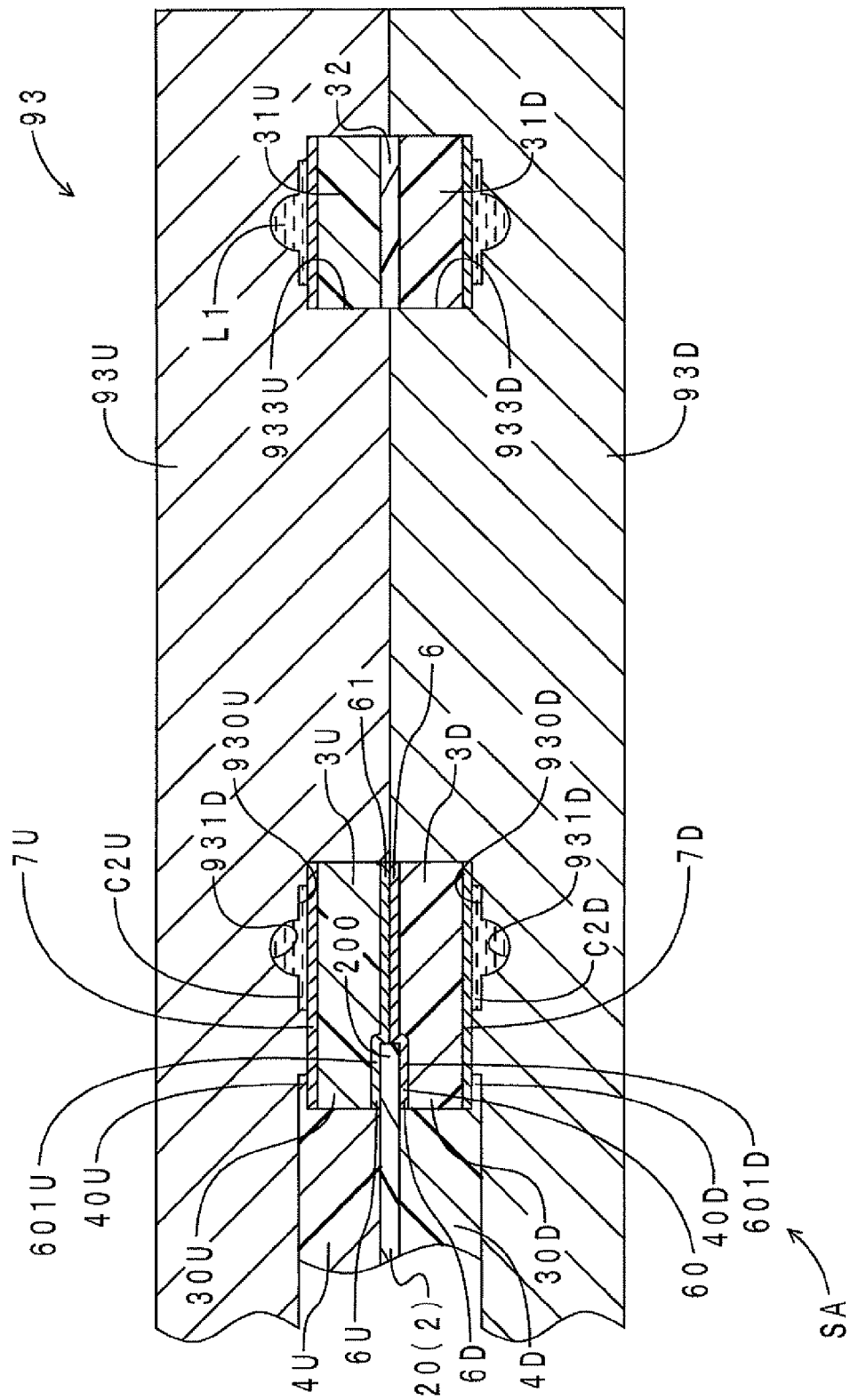
FIG. 11 is a schematic view of an integration step of a method for manufacturing the fuel cell.
Figure 13:
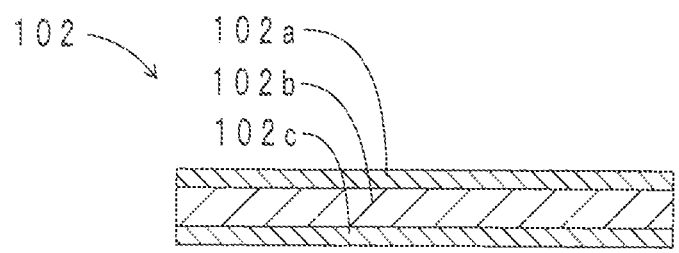
FIG. 13 is a schematic view of a gasket original sheet preparation step of a method for manufacturing the related-art fuel cell.
Figure 14:
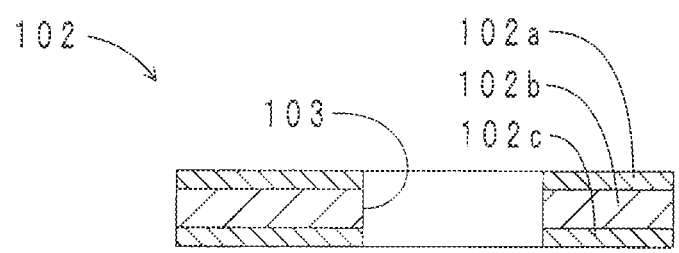
FIG. 14 is a schematic view of a gasket original sheet punching step of the method for manufacturing the fuel cell.
Figure 15:
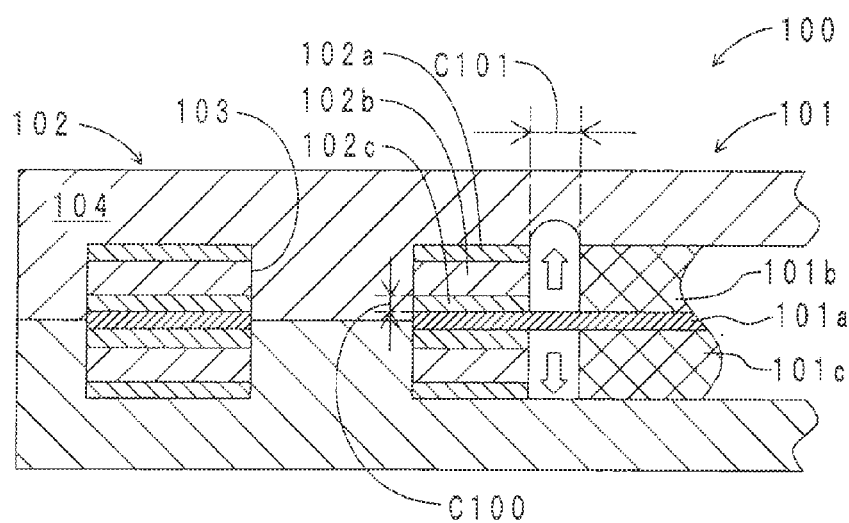
FIG. 15 is a schematic view of an in-cavity arrangement step of the method for manufacturing the fuel cell.

FIG. 11 shows a schematic view of an integration step of a method for manufacturing a fuel cell of this embodiment. Note that portions corresponding to those of FIG. 7 are denoted by the same reference symbols. As shown in FIG. 11, the upper cavity C2U and the lower cavity C2D are separately and individually arranged in the metal mold 93. The cavity C2U has a shape corresponding to the gasket 5U of FIG. 10. The cavity C2D has a shape corresponding to the gasket 5D of FIG. 10. In the integration step, the gaskets 5U and 5D of FIG. 10 are formed by pouring the gasket raw material L1 in the cavities C2U and C2D. The first cross-linking adhesive member 6 and the second cross-linking adhesive members 7U and 7D cause cross-linking reactions.

The fuel cell, a fuel cell stack, and the method for manufacturing the fuel cell of this embodiment have advantageous effects similar to those of the fuel cell, the fuel cell stack, and the method for manufacturing a fuel cell of the first embodiment regarding portions having common configurations.

In the fuel cell of this embodiment, the gaskets 5U and 5D and the second cross-linking adhesive members 7U and 7D are subjected to cross-linking adhesion. In addition, the frames 3U and 3D and the second cross-linking adhesive members 7U and 7D are subjected to cross-linking adhesion. Therefore, the sealability and the adhesiveness between the gaskets 5U and 5D and the second cross-linking adhesive members 7U and 7D and between the frames 3U and 3D and the second cross-linking adhesive members 7U and 7D are high. The second cross-linking adhesive members 7U and 7D are formed of EPDM, and therefore are highly water-repellent. Thus, moisture hardly reaches an adhesion boundary surface between the gaskets 5U and 5D and the second cross-linking adhesive members 7U and 7D and an adhesion boundary surface between the frames 3U and 3D and the second cross-linking adhesive members 7U and 7D. That is, the sealability and the adhesiveness between the gaskets 5U and 5D and the second cross-linking adhesive members 7U and 7D and between the frames 3U and 3D and the second cross-linking adhesive members 7U and 7D are hardly degraded.

The second cross-linking adhesive members 7U and 7D are formed of EPDM, and therefore have wide elastic deformation regions. Thus, the difference in deformation amount between the gaskets 5U and 5D and the frames 3U and 3D can be easily offset. The sealability and the adhesiveness between the gaskets 5U and 5D and the second cross-linking adhesive members 7U and 7D and between the frames 3U and 3D and the second cross-linking adhesive members 7U and 7D are hardly degraded in this regard as well. With the fuel cell of this embodiment, the gaskets 5U and 5D and the frames 3U and 3D can be firmly connected via the second cross-linking adhesive members 7U and 7D.

In the fuel cell of this embodiment, the outer periphery portion 200 of the electrolyte membrane 20, the frame inner periphery portions 30U and 30D of the frames 3U and 3D, and the outer periphery portions 40U and 40D of the gas diffusion layers 4U and 4D are stacked in the thickness direction.

The third intermediate portions 601U and 601D of the membrane accommodating portion 60 of the first cross-linking adhesive member 6 are interposed between the outer periphery portion 200 of the electrolyte membrane 20 and the frame inner periphery portions 30U and 30D of the frames 3U and 3D. The third intermediate portions 601U and 601D are subjected to cross-linking adhesion with the outer periphery portion 200 of the electrolyte membrane 20 and the frame inner periphery portions 30U and 30D of the frames 3U and 3D. Therefore, the sealability and the adhesiveness between the third intermediate portions 601U and 601D and the outer periphery portion 200 of the electrolyte membrane 20 are high. In addition, the sealability and the adhesiveness between the third intermediate portions 601U and 601D and the frame inner periphery portions 30U and 30D of the frames 3U and 3D are high.

The second cross-linking adhesive members 7U and 7D are interposed between the frame inner periphery portions 30U and 30D of the frames 3U and 3D and the outer periphery portions 40U and 40D of the gas diffusion layers 4U and 4D. The second cross-linking adhesive members 7U and 7D are subjected to cross-linking adhesion with the frame inner periphery portions 30U and 30D of the frames 3U and 3D and the outer periphery portions 40U and 40D of the gas diffusion layers 4U and 4D. Therefore, the sealability and the adhesiveness between the second cross-linking adhesive members 7U and 7D and the frame inner periphery portions 30U and 30D of the frames 3U and 3D are high. In addition, the sealability and the adhesiveness between the second cross-linking adhesive members 7U and 7D and the outer periphery portions 40U and 40D of the gas diffusion layers 4U and 4D are high.

The third intermediate portions 601U and 601D are formed of EPDM. It is therefore less likely that the third intermediate portions 601U and 601D separate from the outer periphery portion 200 of the electrolyte membrane 20 and the frame inner periphery portions 30U and 30D of the frames 3U and 3D due to heat.

The third intermediate portions 601U and 601D are formed of EPDM, and therefore are highly water-repellent. Thus, moisture hardly reaches an adhesion boundary surface between the outer periphery portion 200 of the electrolyte membrane 20 and the third intermediate portions 601U and 601D and an adhesion boundary surface between the frame inner periphery portions 30U and 30D of the frames 3U and 3D and the third intermediate portions 601U and 601D.

The third intermediate portions 601U and 601D are formed of EPDM, and therefore have wide elastic deformation regions. Thus, the difference in deformation amount between the electrolyte membrane 20 and the frames 3U and 3D can be easily offset. The electrolyte membrane 20 and the frames 3U and 3D can be firmly connected via the third intermediate portions 601U and 601D.

The second cross-linking adhesive members 7U and 7D are formed of EPDM. It is therefore less likely that the second cross-linking adhesive members 7U and 7D separate from the frame inner periphery portions 30U and 30D of the frames 3U and 3D and the outer periphery portions 40U and 40D of the gas diffusion layers 4U and 4D due to heat.

The second cross-linking adhesive members 7U and 7D are formed of EPDM, and therefore are highly water-repellent. Thus, moisture hardly reaches an adhesion boundary surface between the frame inner periphery portions 30U and 30D of the frames 3U and 3D and the second cross-linking adhesive members 7U and 7D and an adhesion boundary surface between the outer periphery portions 40U and 40D of the gas diffusion layers 4U and 4D and the second cross-linking adhesive members 7U and 7D.

The second cross-linking adhesive members 7U and 7D are formed of EPDM, and therefore have wide elastic deformation regions. Thus, the difference in deformation amount between the frames 3U and 3D and the gas diffusion layers 4U and 4D can be easily offset. The frames 3U and 3D and the gas diffusion layers 4U and 4D can be firmly connected via the second cross-linking adhesive members 7U and 7D.

Other Embodiments

The embodiments of the fuel cell, the fuel cell stack, and the method for manufacturing a fuel cell of the present invention have been described above. However, embodiments are not particularly limited to the embodiments described above. Various modified embodiments and improved embodiments which can be carried out by those skilled in the art are also accepted.

For example, the outer periphery portion 200 of the electrolyte membrane 20 may not be sandwiched by the pair of frames 3U and 3D. That is, only the first intermediate portion 61 may be sandwiched between the pair of frames 3U and 3D. Accordingly, the fastening force of the fuel cell stack 10 is hardly transmitted to the outer periphery portion 200 of the electrolyte membrane 20. Therefore, the outer periphery portion 200 of the electrolyte membrane 20 is hardly degraded.

The arrangement method of the first cross-linking adhesive member 6 and the second cross-linking adhesive members 7U and 7D is also not particularly limited. For example, the first cross-linking adhesive member 6 and the second cross-linking adhesive members 7U and 7D may be arranged by applying or spraying liquid rubber.

The material of the pair of frames 3U and 3D is not particularly limited. Various resins (thermosetting resins and thermoplastic resins) such as polyimide, polyethylene naphthalate, epoxy resin including glass material, and the like may be used. Preferably, the material has high heat resistance and chemical resistance.

The material of the gaskets 5U and 5D is not also particularly limited. Fluorine rubber, ethylene-propylene rubber, thermoplastic elastomer, thermosetting silicone resin, thermoplastic resin, or the like may be used other than silicone rubber.

The material of the separators 90U and 90D is not also particularly limited. Carbon (preferably gas-impermeable dense carbon) or the like may be used other than metal. The material of the electrolyte membrane 20 is not also particularly limited. A hydrocarbon (HC) material or the like may be used other than fluororesin. The material and the shape of the gas diffusion layers 4U and 4D are not also particularly limited. A paper form is accepted other than the woven cloth form. The material of the electrode is not also particularly limited. The alloy containing platinum and ruthenium, the alloy containing platinum and nickel, the alloy containing platinum and cobalt, the alloy containing platinum and indium, the alloy containing platinum and iron, the alloy containing platinum and chromium, the alloy containing platinum and manganese, etc. may be used other than platinum.

Material of Cross-Linking Adhesive Member: 1

The material of the first cross-linking adhesive member and the second cross-linking adhesive member used in the fuel cell, the fuel cell stack, and the method for manufacturing a fuel cell according to an embodiment of the present invention will be described below in detail. At least one cross-linking adhesive member of the first cross-linking adhesive member and the second cross-linking adhesive member may be formed of a cross-linked product of a rubber composition including the following contents of (A) to (D), i.e., formed of rubber.

(A) One or more rubber components selected from a group consisting of ethylene-propylene rubber, ethylene-propylene-diene rubber, acrylonitrile-butadiene rubber, and hydrogenated acrylonitrile-butadiene rubber (B) Cross-linking agent selected from organic peroxides of which a 1-hour half-life period temperature is lower than or equal to 130° C.

(C) Cross-linking auxiliary agent (D) Adhesive component formed of at least one of a resorcinol compound together with a melamine compound and a silane coupling agent Hereinafter, "at least one cross-linking adhesive member of the first cross-linking adhesive member and the second cross-linking adhesive member" will be abbreviated as "cross-linking adhesive member".

Rubber Component (A)

First, the rubber component (A) will be described. As the rubber component of the cross-linking adhesive member, one or more selected from a group consisting of ethylene-propylene rubber (EPM), ethylene-propylene-diene rubber (EPDM), acrylonitrile-butadiene rubber (NBR), and hydrogenated acrylonitrile-butadiene rubber (H-NBR) may be used. These rubber components may be used singly or in combination. The rubber components have low gas permeability. Therefore, sealability is improved by using the rubber components.

Cross-Linking Agent (B)

Next, the cross-linking agent (B) will be described. As the cross-linking agent, an organic peroxide of which the 1-hour half-life period temperature is lower than or equal to 130° C. may be used. The "half-life period" refers to time in which the concentration of an organic peroxide becomes half of an initial value. Thus, the "half-life period temperature" is an index showing the decomposition temperature of an organic peroxide. The "1-hour half-life period temperature" is a temperature at which the half-life period becomes 1 hour. That is, the lower the 1-hour half-life period temperature, the easier the decomposition of the organic peroxide at a lower temperature. By using the organic peroxide of which the 1-hour half-life period temperature is lower than or equal to 130° C., cross-linking can be performed at a lower temperature (specifically, lower than or equal to 130° C.) and in a short period of time. Thus, the cross-linking adhesive member can be used also near the electrolyte membrane. With the cross-linking agent (B) described above, a platinum catalyst is unnecessary in the cross-linking. In addition, a curing failure due to impurity, dirt, or the like hardly occurs. Therefore, the cross-linking adhesive member is hardly influenced by the operational environment, and is easily handled.

The organic peroxides of (B) described above include peroxyketal, peroxyester, diacyl peroxide, peroxydicarbonate, and the like. Particularly, at least one of the peroxyketal and the peroxyester of which the 1-hour half-life period temperature is higher than or equal to 100° C. is preferably employed, since cross-linking easily occurs at a temperature of approximately 130° C. and the rubber composition in which the cross-linking agent is added and kneaded can be handled easily. Particularly, one with a 1-hour half-life period temperature of 110° C. or higher is preferable.

Examples of the peroxyketal include n-butyl 4,4-di(t-butylperoxy)valerate, 2,2-di(t-butylperoxy)butane, 2,2-di(4,4-di(t-butylperoxy)cyclohexyl)propane, 1,1-di(t-butylperoxy)cyclohexane, 1,1-di(t-hexylperoxy)cyclohexane, 1,1-di(t-hexylperoxy)-3,3,5-trimethylcyclohexane, 1,1-di(t-butylperoxy)-2-methylcyclohexane, and the like. Examples of the peroxyester include t-butyl peroxybenzoate, t-butyl peroxyacetate, t-hexyl peroxybenzoate, 2,5-dimethyl-2,5-di(benzoylperoxy)hexane, t-butyl peroxy-2-ethylhexyl monocarbonate, t-butyl peroxylaurate, t-butyl peroxyisopropylmonocarbonate, t-butyl peroxy-3,5,5-trimethylhexanoate, t-butyl peroxymaleic acid, t-hexyl peroxyisopropylmonocarbonate, and the like. Particularly, 1,1-di(t-butylperoxy)cyclohexane and t-butyl peroxyacetate are preferable, since the cross-linking agent using them is easily accommodated.

The amount of the cross-linking agent is preferably greater than or equal to 1 part by weight with respect to 100 parts by weight of the rubber component (A) described above so that the cross-linking reaction progresses sufficiently. In consideration of the storage stability of the prepared rubber composition, it is preferably less than or equal to 5 parts by weight.

Cross-Linking Auxiliary Agent (C)

Next, the cross-linking auxiliary agent (C) will be described. The cross-linking auxiliary agent (C) may appropriately be selected according to the type of the cross-linking agent (B) described above. Examples of the cross-linking auxiliary agent include a maleimide compound, triallyl cyanurate (TAC), triallyl isocyanurate (TAIC), trimethylolpropane trimethacrylate (TMPT), and the like. Particularly, using the maleimide compound is preferable since the cross-linking speed becomes faster. In this case, the amount of the cross-linking auxiliary agent is preferably greater than or equal to 0.1 part by weight with respect to 100 pans by weight of the rubber component (A) described above so that the cross-linking reaction progresses sufficiently. The amount of the cross-linking auxiliary agent is preferably less than or equal to 3 parts by weight, since the adhesive force decreases when the cross-linking reaction becomes too fast due to a large amount of the cross-linking auxiliary agent.

Adhesive Component (D)

Next, the adhesive component (D) will be described. For example, in the case where the resorcinol compound and the melamine compound are included as the adhesive component, the melamine compound becomes a methylene donor, and the resorcinol compound becomes a methylene acceptor. At the time of cross-linking, a methylene group is donated to form a chemical bond between the resorcinol compound and the rubber component as well as an opponent member, whereby the rubber component and the opponent member are adhered. In the case where a silane coupling agent is included as the adhesive component a chemical bond is formed between the rubber component and the opponent member by the silane coupling agent, whereby the two are adhered.

The adhesive force due to the adhesive component is strong, and the adhesive force hardly decreases even in the operational environment of a fuel cell stack. Thus, even in the case where the fuel cell stack is operated for a long period of time, high sealability is ensured. Accordingly, the operational reliability of the fuel cell stack can be improved.

The adhesive component (D) is formed of at least one of the resorcinol compound together with the melamine compound and the silane coupling agent. That is, the adhesive component may be only the resorcinol compound and the melamine compound, or only the silane coupling agent. In the case where both the resorcinol compound together with the melamine compound and the silane coupling agent are included, the adhesive force is further improved.

Examples of the resorcinol compound include resorcin, modified resorcin formaldehyde resin, resorcin formaldehyde (RF) resin, and the like. A single one or a mixture of two or more of these may be used. Particularly, the modified resorcin formaldehyde resin is preferable in terms of low volatility, low hygroscopicity, and high compatibility with rubber. Examples of the modified resorcin formaldehyde resin include those represented by general formulas (1) to (3) below. One shown by the general formula (1) is particularly preferable. Note that reference symbols "n" all indicate an integer in the general formulas (1) to (3). Reference symbol "R" indicates a hydrocarbon group in the general formula (1).

General Formula (1)

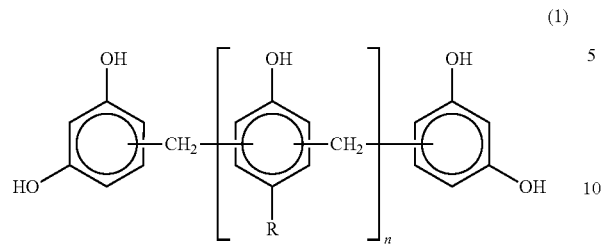

(1)

In the formula, reference symbol "R" indicates a hydrocarbon group, and reference symbol "n" indicates an integer.

General Formula (2)

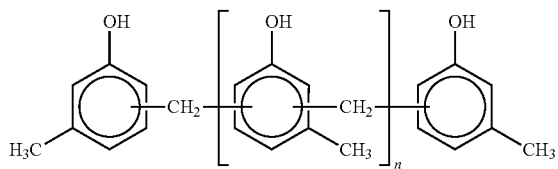

(2)

In the formula, reference symbol "n" indicates an integer.

General Formula (3)

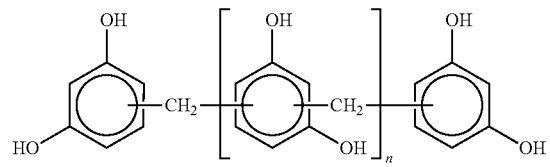

(3)

In the formula, reference symbol "n" indicates an integer.

In order to obtain a desired adhesive force, the amount of the resorcinol compound is preferably greater than or equal to 0.1 part by weight with respect to 100 parts by weight of the rubber component (A) described above. It is more preferably greater than or equal to 0.5 parts by weight. The amount of the resorcinol compound is preferably less than or equal to 10 parts by weight, since an excessive amount of the resorcinol compound causes a decrease in the properties of rubber. It is more preferably less than or equal to 5 parts by weight.

Examples of the melamine compound include a methylated formaldehyde melamine polymer, hexamethylene tetramine, and the like. One or more of these compounds may be used singly or in combination. These are decomposed by heat in the cross-linking, and supply formaldehyde to the system. Particularly, the methylated formaldehyde melamine polymer is preferable in terms of low volatility, low hygroscopicity, and high compatibility with rubber. The methylated formaldehyde melamine polymer represented by a general formula (4) below is preferable, for example. Particularly, a mixture including 43 to 44% by weight of a compound in which n=1, 27 to 30% by weight of a compound in which n=2, and 26 to 30% by weight of a compound in which n=3 in the general formula (4) is preferable.

General Formula (4)

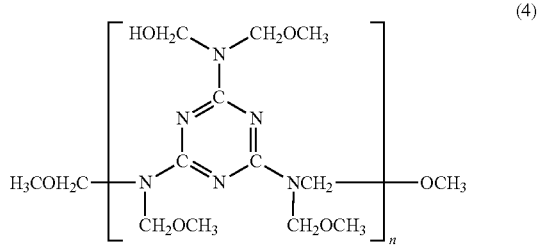

(4)

In the formula, reference symbol "n" indicates an integer.

The compound ratio of the resorcinol compound and the melamine compound is preferably in a range of 1:0.5 to 1:2 by weight. It is more preferably in a range of 1:0.77 to 1:1.5. In the case where the compound ratio of the melamine compound with respect to the resorcinol compound is less than 0.5, the tensile strength, the stretch, and the like of the rubber tend to slightly decrease. On the other hand, when the compound ratio of the melamine compound exceeds 2, the adhesive force reaches a limit. Therefore, further increase in the compound ratio of the melamine compound leads to an increase in cost.

The silane coupling agent may appropriately be selected in consideration of the adhesiveness and the like from a group of compounds having an epoxy group, an amino group, a vinyl group, or the like as a functional group. Examples include vinyltrimethoxysilane, vinyltriethoxysilane, vinyl-tris(2-methoxyethoxy)silane, 3-methacryloxypropyltrimethoxysilane, 3-methacryloxypropyltriethoxysilane, 3-glycidoxypropyltrimethoxysilane, 3-glycidoxypropyltriethoxysilane, 3-glycidoxypropylmethyldiethoxysilane, 2-(3,4-epoxycyclohexyl)ethyltrimethoxysilane, N-2(aminoethyl)3-aminopropyltrimethoxysilane, 3-aminopropyltrimethoxysilane, N-phenyl-3-aminopropyltrimethoxysilane, and the like. One or more of these compounds may be used singly or in combination. Particularly, when one or more selected from the group of compounds having an epoxy group is used, the adhesive force is improved, and the adhesive force hardly decreases even in the operational environment of a fuel cell stack. Specifically, 3-glycidoxypropyltrimethoxysilane, 3-glycidoxypropyltriethoxysilane, 3-glycidoxypropylmethyldiethoxysilane, 2-(3,4-epoxycyclohexyl)ethyltrimethoxysilane, and the like are preferable.

In order to obtain a desired adhesive force, the amount of the silane coupling agent is preferably greater than or equal to 0.5 parts by weight with respect to 100 parts by weight of the rubber component (A) described above. It is more preferably greater than or equal to 2 parts by weight. An excessive amount of silane coupling agent leads to a decrease in the properties of rubber, and possibly a decrease in processability. Therefore, the amount of the silane coupling agent is preferably less than or equal to 10 parts by weight, and more preferably, less than or equal to 6 parts by weight.

Additive

Next, additives will be described. The rubber composition of the cross-linking adhesive member may include various additives which are used as additives for general rubber other than the contents of (A) to (D) described above. For example, it is preferable to include carbon black as a reinforcing agent. The grade of the carbon black is not particularly limited, and may appropriately be selected from SAF, ISAF, HAF, MAF, FEF, GPF, SRF, FT, MT, and the like. In order to obtain desired durability, the amount of the carbon black is preferably greater than or equal to 30 parts by weight with respect to 100 parts by weight of the rubber component (A) described above, Note that the amount of the carbon black is preferably less than or equal to 150 parts by weight in consideration of the easiness of kneading, forming processability, and the like.

Other additives include a softener, a plasticizer, an antioxidant, a tackifier, a processing aid, and the like. The softeners include: petroleum-based softeners such as process oil, lubricating oil, paraffin, liquid paraffin, petroleum asphalt, and petrolatum; fatty oil-based softeners such as castor oil, linseed oil, canola oil, and palm oil; waxes such as tall oil, a rubber substitute, beeswax, carnauba wax, and lanolin; linoleic acid; palmitic acid; stearic acid; lauric acid; and the like. The amount of the softener is preferably up to approximately 40 parts by weight with respect to 100 parts by weight of the rubber component (A) described above. The plasticizers include organic acid derivatives such as dioctyl phthalate (DOP) and phosphoric acid derivatives such as tricresyl phosphate. The amount of the plasticizer is preferably approximately 40 parts by weight at most with respect to 100 parts by weight of the rubber component (A) described above, in a similar manner to that of the softener. The antioxidants include phenolic antioxidants, imidazole-based antioxidants, waxes, and the like, and the amount is preferably approximately 0.5 to 10 parts by weight with respect to 100 parts by weight of the rubber component (A) described above.

The rubber composition can be prepared by mixing the contents of (A) to (D) described above and the various additives as necessary. For example, the respective materials other than the cross-linking agent (B), the cross-linking auxiliary agent (C), and the adhesive component (D) are mixed in advance, and then are kneaded for several minutes at 80 to 140° C. After the kneaded product is cooled, the cross-linking agent (B), the cross-linking auxiliary agent (C), and the adhesive component (D) are added, and are kneaded for 5 to 30 minutes at a roll temperature of 40 to 70° C. using a roller such as an open roller, whereby the rubber composition can be prepared. Note that the adhesive component (D) may be added at the time of the preparatory mixture.

Material of Cross-Linking Adhesive Member: 2

The cross-linking adhesive member may be formed of a cross-linked product of rubber composition including the contents of (a) to (c) below, i.e., formed of rubber.
(a) One or more rubber components selected from a group consisting of ethylene-propylene rubber, ethylene-propylene-diene rubber, acrylonitrile-butadiene rubber, and hydrogenated acrylonitrile-butadiene rubber
(b) Cross-linking agent selected from organic peroxides of which the 1-hour half-life period temperature is lower than or equal to 120° C.
(c) Silane coupling agent Rubber Component (a)

First, the rubber component (a) will be described. As the rubber component of the cross-linking adhesive member, one or more selected from a group consisting of EPM, EPDM, NBR, and H-NBR may be used. One or more of these components may be used singly or in combination. These rubber components have low gas permeability. Thus, the sealability is improved.

Cross-Linking Agent (b)

Next, the cross-linking agent (b) will be described. As the cross-linking agent, an organic peroxide of which the 1-hour half-life period temperature is lower than or equal to 120° C. may be used. By using the organic peroxide of which the 1-hour half-life period temperature is lower than or equal to 120° C., cross-linking can be performed at a lower temperature (specifically, lower than or equal to 120° C.) and in a short period of time. Thus, the cross-linking adhesive member can be used also near the electrolyte membrane. With the cross-linking agent (b) described above, a platinum catalyst is unnecessary in the cross-linking. In addition, a curing failure due to impurity, dirt, or the like hardly occurs. Therefore, the cross-linking adhesive member is hardly influenced by the operational environment, and is easily handled.

The organic peroxides of (b) described above include diacyl peroxide, peroxyester, peroxydicarbonate, and the like. Particularly, the diacyl peroxide of which the 1-hour half-life period temperature is higher than or equal to 90° C. is preferably employed, since cross-linking easily occurs at approximately 120° C. Particularly, one with a 1-hour half-life period temperature of lower than 110° C. or further lower than 100° C. is preferable.

Examples of the diacyl peroxide include benzoyl peroxide, dibenzoyl peroxide, a mixture of di(3-methylbenzoyl)peroxide, benzoyl(3-methylbenzoyl)peroxide, and dibenzoyl peroxide, and the like. Examples of the peroxyester include t-butyl peroxy-2-ethylhexanoate, t-hexyl peroxy-2-ethylhexanoate, and the like. Particularly, dibenzoyl peroxide is preferable, since the cross-linking agent using it can be easily stored.

The amount of the cross-linking agent is preferably greater than or equal to 0.5 parts by weight with respect to 100 parts by weight of the rubber component (a) described above so that the cross-linking reaction progresses sufficiently. In consideration of the storage stability of the prepared rubber composition in which the cross-linking agent is added, it is preferably less than or equal to 5 parts by weight.

Silane Coupling Agent

Next, the silane coupling agent (c) will be described. With the cross-linking adhesive member including the silane coupling agent (c), a strong chemical bond is formed between the rubber component and the opponent member by the silane coupling agent, whereby the two are adhered. The adhesive force of the two is high and hardly decreases even in the operation environment of a fuel cell stack. Thus, even in the case where the fuel cell stack is operated for a long period of time, high sealability is ensured. Accordingly, the operational reliability of the fuel cell stack can be improved.

The silane coupling agent (c) may appropriately be selected in consideration of the adhesiveness and the like from a group of compounds having an epoxy group, an amino group, a vinyl group, or the like as a functional group. Examples include vinyltrimethoxysilane, vinyltriethoxysilane, vinyl-tris(2-methoxyethoxy)silane, 3-methacryloxypropyltrimethoxysilane, 3-methacryloxypropyltriethoxysilane, 3-glycidoxypropyltrimethoxysilane, 3-glycidoxypropyltriethoxysilane, 3-glycidoxypropylmethyldiethoxysilane, 2-(3,4-epoxycyclohexyl)ethyltrimethoxysilane, N-2(aminoethyl)3-aminopropyltrimethoxysilane, 3-aminopropyltrimethoxysilane, N-phenyl-3-aminopropyltrimethoxysilane, and the like. One or more of these compounds may be used singly or in combination. Particularly, when one or more selected from the group of compounds having an epoxy group is used, the adhesive force is improved, and the adhesive force hardly decreases even in the operational environment of a fuel cell stack. Specifically, 3-glycidoxypropyltrimethoxysilane, 3-glycidoxypropyltriethoxysilane, 3-glycidoxypropylmethyldiethoxysilane, 2-(3,4-epoxycyclohexyl)ethyltrimethoxysilane, and the like are preferable.

In order to obtain a desired adhesive force, the amount of the silane coupling agent is preferably greater than or equal to 0.5 parts by weight with respect to 100 parts by weight of the rubber component (a) described above. It is more preferably greater than or equal to 2 parts by weight. An excessive amount of the silane coupling agent leads to a decrease in the properties of rubber, and possibly a decrease in processability. Therefore, the amount of the silane coupling agent is preferably less than or equal to 10 parts by weight. It is more preferably less than or equal to 5 parts by weight, or further less than or equal to 1 part by weight.

Additive

Next, additives will be described. The rubber composition of the cross-linking adhesive member may include various additives which are used as additives for general rubber other than the contents of (a) to (c) described above. For example, carbon black is widely used as a reinforcing agent. However, when a large amount of the carbon black is contained, there is a possibility of the cross-linking reaction being inhibited due to a reaction with a radical generated from the cross-linking agent (b) described above at the time of cross-linking. Thus, in the case where the carbon black is contained, the amount is preferably less than or equal to 10 parts by weight with respect to 100 parts by weight of the rubber component (a) described above. It is more preferably less than or equal to 5 parts by weight, or further less than or equal to 1 part by weight.

As a reinforcing agent to be used instead of the carbon black or together with the carbon black, white carbon is preferable, for example. The white carbon is known as amorphous silica, and specific examples thereof include dry silica, wet silica, synthetic silicate, and the like. The amount of the white carbon is preferably greater than or equal to 30 parts by weight with respect to 100 parts by weight of the rubber component (a) described above. Note that the amount of the white carbon is preferably less than or equal to 80 parts by weight in consideration of the easiness of kneading, forming processability, and the like.

Other additives include a softener, a plasticizer, an antioxidant, a tackifier, a processing aid, and the like. The softeners include: petroleum-based softeners such as process oil, lubricating oil, paraffin, liquid paraffin, petroleum asphalt, and petrolatum; fatty oil-based softeners such as castor oil, linseed oil, canola oil, and palm oil; waxes such as tall oil, a rubber substitute, beeswax, carnauba wax, and lanolin; linoleic acid; palmitic acid; stearic acid; lauric acid; and the like. The amount of the softener is preferably up to approximately 10 parts by weight with respect to 100 parts by weight of the rubber component (a) described above in consideration of the strength of the cross-linking adhesive member to be manufactured. The plasticizers include organic acid derivatives such as dioctyl phthalate (DOP) and phosphoric acid derivatives such as tricresyl phosphate. The amount of the plasticizer is preferably up to approximately 10 parts by weight with respect to 100 parts by weight of the rubber component (a) described above in consideration of the strength of the cross-linking adhesive member to be manufactured, in a similar manner to that of the softener. The antioxidants include phenolic antioxidants, imidazole-based antioxidants, waxes, and the like, and the amount is preferably 0.5 to 10 parts by weight with respect to 100 parts by weight of the rubber component (a) described above.

The rubber composition can be prepared by mixing the contents of (a) to (c) described above and various additives as necessary. For example, the respective materials other than the cross-linking agent (b) and the silane coupling agent (c) are mixed in advance, and then are kneaded for several minutes at 80 to 140° C. After the kneaded product is cooled, the cross-linking agent (b) and silane coupling agent (c) are added, and are kneaded for 5 to 30 minutes at a roll temperature of 40 to 60° C. using a roller such as an open roller, whereby the rubber composition can be prepared. Note that the silane coupling agent (c) may be added at the time of the preparatory mixture.

What is claimed is:

1. A fuel cell comprising:
a membrane electrode assembly having an electrolyte membrane and a pair of electrodes arranged on both sides of the electrolyte membrane in a thickness direction;
a pair of resin frames having a frame shape with an opening in which a gas diffusion layer is arranged and holding an outer periphery portion of the electrolyte membrane;
a pair of gas diffusion layers arranged inside the pair of resin frames and on both sides of the membrane electrode assembly in the thickness direction of the membrane electrode assembly,
a gasket covering at least a part of the pair of resin frames; and
a first cross-linking adhesive member having a first and a second adhesive layer, the first cross-linking adhesive member formed of rubber including an adhesive component, the first cross-linking adhesive member including a membrane accommodating portion having an indented shape for accommodating the outer periphery portion of the electrolyte membrane and a first intermediate portion formed by contacting at least a portion of the first adhesive layer with a portion of the second adhesive layer and the intermediate portion being interposed between the pair of frames, the first cross-linking adhesive member being subjected to cross-linking adhesion
wherein at least the outer periphery portion of the electrolyte membrane and the pair of frames are adhered to the first cross-linking adhesive member, and the fuel cell is held between a pair of separators each having a thin plate shape and in elastic contact with the gasket.

2. The fuel cell according to claim 1, wherein the membrane accommodating portion includes a second intermediate portion interposed between the outer periphery portion of the electrolyte membrane and an outer periphery portion of the gas diffusion layers.

3. The fuel cell according to claim 1, wherein the gasket integrally includes a holding frame portion which holds an outer periphery portion of the gas diffusion layers from outside in the thickness direction.

4. The fuel cell according to claim 1, further comprising a second cross-linking adhesive member formed of rubber between the gasket and the pair of resin frames.

5. The fuel cell according to claim 1, wherein the gasket integrally includes a rib that is arranged outside the pair of resin frames in the thickness direction and is capable of making elastic contact with an opponent member adjacent in the thickness direction.

6. The fuel cell according to claim 5, wherein the gasket includes the rib and a base portion which is formed integrally at a base of the rib to hold the rib.

7. The fuel cell according to claim 1, wherein:
a gap is formed between a frame inner periphery portion of the pair of resin frames and an outer periphery portion of the gas diffusion layers;
the electrolyte membrane includes an exposed portion which is exposed externally from the gap; and the first cross-linking adhesive member covers the exposed portion.

8. The fuel cell according to claim 1, wherein no gap is formed between a frame inner periphery portion of the pair of resin frames and an outer periphery portion of the gas diffusion layers.

9. The fuel cell according to claim 8, wherein:
the outer periphery portion of the electrolyte membrane, the frame inner periphery portion of the pair of resin frames, and the outer periphery portion of the gas diffusion layers are stacked outwardly from inside in the thickness direction;
the membrane accommodating portion includes a third intermediate portion interposed between the outer periphery portion of the electrolyte membrane and the frame inner periphery portion of the pair of resin frames; and
a second cross-linking adhesive member is interposed between the frame inner periphery portion of the pair of resin frames and the outer periphery portion of the gas diffusion layers.

10. A fuel cell stack comprising a plurality of the fuel cells according to claim 1 stacked on one another, via the pair of separators.

11. The fuel cell according to claim 1, wherein the gasket and the pair of resin frames are in direct contact with each other.

* * * * *

UNITED STATES PATENT AND TRADEMARK OFFICE
CERTIFICATE OF CORRECTION

PATENT NO. : 8,974,982 B2
APPLICATION NO. : 12/259669
DATED : March 10, 2015
INVENTOR(S) : Hideaki Tanahashi et al.

It is certified that error appears in the above-identified patent and that said Letters Patent is hereby corrected as shown below:

ON THE TITLE PAGE

Delete "(73) Assignee: Tokai Rubber Industries, Ltd., Komaki-shi (JP)"

and Insert --(73) Assignee: Sumitomo Riko Company Limited, Komaki, (JP)--.

Signed and Sealed this
Twelfth Day of January, 2016

Michelle K. Lee
*Director of the United States Patent and Trademark Office*